US009578626B2

(12) United States Patent
Sadasivam et al.

(10) Patent No.: US 9,578,626 B2
(45) Date of Patent: Feb. 21, 2017

(54) SYSTEMS AND METHODS FOR SHARING CONTEXT INFORMATION IN A NEIGHBOR AWARE NETWORK

(71) Applicant: QUALCOMM Incorporated, San Diego, CA (US)

(72) Inventors: Shankar Sadasivam, San Diego, CA (US); Ashwin Swaminathan, San Diego, CA (US); Jin Won Lee, San Diego, CA (US); Santosh Paul Abraham, San Diego, CA (US); George Cherian, San Diego, CA (US); Li Ding, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 14/205,152

(22) Filed: Mar. 11, 2014

(65) Prior Publication Data

US 2014/0269555 A1    Sep. 18, 2014

Related U.S. Application Data

(60) Provisional application No. 61/805,099, filed on Mar. 25, 2013, provisional application No. 61/799,323, filed on Mar. 15, 2013.

(51) Int. Cl.
*H04L 29/08* (2006.01)
*H04W 72/04* (2009.01)
(Continued)

(52) U.S. Cl.
CPC ........ *H04W 72/0406* (2013.01); *G01S 5/0072* (2013.01); *G01S 5/0289* (2013.01);
(Continued)

(58) Field of Classification Search
CPC .... H04W 72/0406; H04W 4/006; H04W 4/06; H04W 4/005; H04W 8/005; H04W 4/008; G01S 5/0072; G01S 5/0289
(Continued)

(56) References Cited

U.S. PATENT DOCUMENTS 7,656,822 B1    2/2010   Abdelaziz et al.
7,685,606 B2    3/2010   Chang
(Continued)

FOREIGN PATENT DOCUMENTS

EP    2131553 A2    12/2009
EP    2557892 A1    2/2013
(Continued)

OTHER PUBLICATIONS

Bao X., et al., "Vupoints: collaborative sensing and video recording through mobile phones," ACM SIGCOMM Computer Communication Review archive, Jan. 1, 2010, vol. 40 Issue 1, pp. 100-105.
(Continued)

*Primary Examiner* — Charles C Jiang
*Assistant Examiner* — Kyaw Z Soe
(74) *Attorney, Agent, or Firm* — Knobbe Martens Olson & Bear LLP

(57) ABSTRACT

Systems and methods share context information on a neighbor aware network. A method for communicating data in a wireless communications network is disclosed. The method includes receiving, by a device, a first message from a station, decoding the message to determine service information, the service information identifying a service provided by the station, generating a second message, wherein the second message is generated to indicate the service provided by the station and service information of the device, and transmitting, by the device, the second message to a remote station.

30 Claims, 24 Drawing Sheets

(51) Int. Cl.
  *H04W 8/00* (2009.01)
  *G01S 5/02* (2010.01)
  *H04W 4/00* (2009.01)
  *G01S 5/00* (2006.01)
  *H04W 4/06* (2009.01)
  *H04W 4/02* (2009.01)

(52) U.S. Cl.
  CPC ........... *H04W 4/005* (2013.01); *H04W 4/006* (2013.01); *H04W 4/008* (2013.01); *H04W 4/06* (2013.01); *H04W 8/005* (2013.01); *H04L 67/28* (2013.01); *H04W 4/023* (2013.01); *H04W 4/027* (2013.01)

(58) Field of Classification Search
  USPC ........................................................ 370/329
  See application file for complete search history.

(56) References Cited

U.S. PATENT DOCUMENTS

| | | | |
|---|---|---|---|
| 7,710,262 B2 | 5/2010 | Ruha | |
| 8,768,323 B2* | 7/2014 | Liu | .......................... H04L 67/16 370/338 |
| 2003/0088544 A1* | 5/2003 | Kan | .................. G06F 17/30867 |
| 2005/0078672 A1 | 4/2005 | Caliskan et al. | |
| 2006/0023674 A1* | 2/2006 | Goring | ................ H04L 12/5693 370/338 |
| 2007/0058634 A1 | 3/2007 | Gupta et al. | |
| 2007/0110010 A1 | 5/2007 | Kotola et al. | |
| 2007/0206596 A1* | 9/2007 | Ishikawa | ................. H04L 67/22 370/390 |
| 2009/0063691 A1 | 3/2009 | Kalofonos et al. | |
| 2009/0313290 A1 | 12/2009 | Narayanan et al. | |
| 2010/0036914 A1* | 2/2010 | Chesta | ................ G06F 17/3087 709/205 |
| 2010/0222080 A1 | 9/2010 | Carreras et al. | |
| 2010/0235523 A1 | 9/2010 | Garcia et al. | |
| 2010/0322213 A1* | 12/2010 | Liu | ........................ H04L 67/16 370/338 |
| 2011/0029659 A1* | 2/2011 | Shah | ....................... H04L 12/12 709/224 |
| 2011/0060816 A1 | 3/2011 | Kumar et al. | |
| 2011/0082939 A1* | 4/2011 | Montemurro | ....... H04W 76/023 709/227 |
| 2012/0284328 A1* | 11/2012 | Chung | ................ H04L 67/2833 709/203 |
| 2012/0317194 A1 | 12/2012 | Tian | |
| 2013/0064175 A1* | 3/2013 | Pandey | ................. H04W 8/005 370/328 |
| 2014/0269658 A1 | 9/2014 | Sadasivam et al. | |

FOREIGN PATENT DOCUMENTS

WO    WO-0078001 A2    12/2000
WO    WO-2012134752 A1    10/2012

OTHER PUBLICATIONS

Cheng H.T., et al., "OmniSense: A Collaborative Sensing Framework for User Context Recognition Using Mobile Phones," HotMobile, 2010, 1 page.

International Search Report and Written Opinion—PCT/US2014/024695—ISA/EPO—Sep. 10, 2014.

Laroia R., "Future of Wireless? The Proximate Internet", Jan. 7, 2010 (Jan. 7, 2010), XP055135052, 38 pages, Retrieved from the Internet: URL: http://www.cedt.iisc.ernet.in/people/kuri/Comsnets/Keynotes/Keynote-Rajiv-Laroia.pdf [retrieved on Aug. 18, 2014].

\* cited by examiner

SYSTEMS AND METHODS FOR SHARING CONTEXT INFORMATION IN A NEIGHBOR AWARE NETWORK

CROSS-REFERENCE TO RELATED APPLICATIONS

This application claims the benefit of U.S. Provisional Application 61/805,099, filed Mar. 25, 2013, and entitled "SYSTEMS AND METHOD FOR SHARING CONTEXT INFORMATION IN A NEIGHBOR AWARE NETWORK," and assigned to the assignee hereof. This application also claims the benefit of U.S. Provisional Application 61/799,323, filed Mar. 15, 2013, and entitled "SYSTEMS AND METHODS FOR PROXY BASED NAN OPERATION." The disclosures of these prior applications are considered part of this application, and are hereby incorporated by reference in their entirety.

FIELD

The present application relates generally to wireless communications in a neighbor aware network, and more specifically to systems, methods, and devices for sharing context information in a neighbor aware network.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may each be configured to provide services. For example, a device may include hardware, such as a sensor, that is used to capture data. An application running on the device may then use the captured data to perform an operation. In some cases, the captured data may be useful to other devices in the wireless network. The other devices in the wireless network could include similar hardware so as to capture similar data. Alternatively, the device could provide these services (e.g., the captured data) to the other devices in the wireless network. The device may inform the other devices in the wireless network of the services that the device provides by advertising this information over the wireless network. However, if one or more devices in the wireless network advertise the services that each respective device provides, this may result in increased power consumption by the respective devices and/or increase a number of packet collisions in the wireless network. Thus, improved systems, methods, and devices for communicating in a wireless network are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features disclosed provide for distributed discovery and utilization of service or context information within a Neighbor Aware Network (NAN).

Aspects disclosed include a method for communicating data in a wireless communications network. An apparatus disclosed includes a processor configured to perform the method. Other aspects include a computer readable medium encoding instructions that cause a processor to perform the method.

The method includes receiving, by a device, a first message from a station, decoding the message to determine service information, the service information identifying a service provided by the station, generating a second message, wherein the second message is generated to indicate the service provided by the station and service information of the device, and transmitting, by the device, the second message to a remote station. In some aspects, the method also includes receiving a proxy preference number from the station; and comparing the received proxy preference number with a proxy preference number of the device, wherein the generating and transmitting of the second message is conditioned on a result of the comparison. In some aspects, the method includes receiving a third message from the remote station; and decoding the third message to determine an error indicating that the remote station cannot contact the station. In some aspects, the method also includes determining a number of errors from the remote station based on the decoding of the third message; and comparing the number of errors to a predetermined threshold number of errors, wherein the transmission of the second message is conditioned on the comparison.

Some aspects of the method also include transmitting a proxy offer message to the station in response to decoding the service information from the station; and generating the second message if a proxy accept message is received from the station. In some aspects the method also includes receiving a proxy request message from the station; determining whether to accept the proxy request; generating a broadcast message indicating the device is configured to serve as a proxy station if the proxy request is accepted; and transmitting the broadcast message to a broadcast address.

In some aspects, the method also includes generating the broadcast message to indicate an incentive to become a proxy and to indicate a time when proxy service is available. In some aspects, the method includes determining whether to accept the proxy request based on capabilities of the device or based on a command issued by a user of the device. In some aspects, the service information comprises at least one of an indication of an availability of pressure measurements, an indication of an availability of temperature measurements, an indication of an availability of location measurements, an indication of an availability of ambient sound measurements, an indication of an availability of ambient light measurements, an indication of an availability of humidity measurements, an indication of an availability of emergency alarm sensor measurements, a pressure measurement, a temperature measurement, a location measurement, an ambient sound measurement, an ambient light measurement, a humidity measurement, and an emergency alarm sensor measurement. In some aspects, the method also includes receiving a station identifier and a wake up schedule from the station, decoding one or more of a media access control (MAC) address, an application based identifier, an Internet Protocol (IP) address, or a device name from the station identifier, decoding one or more of a time when the station will be awake to listen for messages from other devices and a channel that the station will use to communicate during the time, from the wake up schedule; and generating the second message to indicate the wake up schedule.

DETAILED DESCRIPTION

Figure 1A:
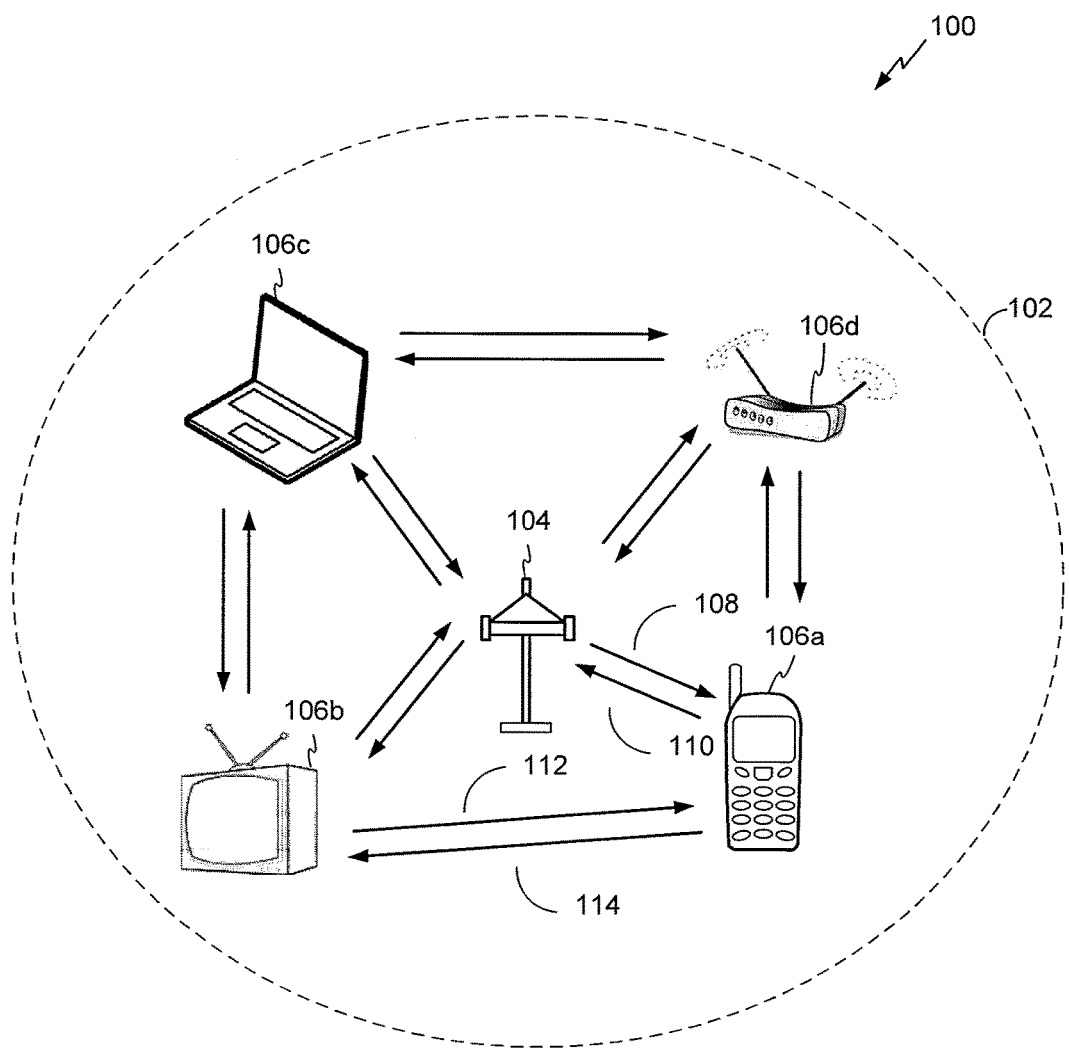
FIG. 1a illustrates an example of a wireless communication system.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. However, the various aspects described herein may apply to any communication standard In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, one or more nodes of a neighbor aware network may transmit messages between each other. The nodes may also exchange discovery queries and responses to provide for service discovery between devices operating within the same peer to peer or neighbor aware network. A neighbor aware network may be considered a peer to peer network or an ad-hoc network in some aspects.

Today's smartphones are typically equipped with one or more sensors of environmental information. In some aspects, at least a portion of the sensors may provide information relating to an environment external to the device. These sensors may include an ambient light sensor, proximity sensor, atmospheric pressure sensor, temperature sensor, and the like. Other sensors may provide environmental information related to the device itself. For example, some devices include sensors for spectral distribution of light received from a light sensor, or inertial-motion related information such as information received from one or more of an accelerometer, magnetometer, and/or gyroscope. Some devices also include sensors such as a microphone, camera, GPS receiver, WiFi transceiver, and/or Bluetooth transceiver. The sensors of environmental information, coupled with processing power available on modern smart phones, provide an opportunity to collect and analyze information about a user context, or the environment in which a user is operating their phone.

Managing the power consumption of such sensing and analyzing can present a challenge in some implementations. Utilization of some sensors can consume substantial power, such that the sensors may only be utilized for finite periods of time to ensure adequate battery life. As one example, there is a great demand for activity classifiers that may utilize data collected from an accelerometer in a smartphone. While the accelerometers typically consume relatively low amounts of power, the data they provide may not be adequate for activity classifiers that attempt to resolve whether a smartphone is "stationary" or in a "driving" environment. The resolution of the activity classifier can be improved if the accelerometer data is augmented with data from a GPS receiver. GPS receivers may consume substantially more power relative to the accelerometer, and thus an activity classifier that utilizes GPS data may result in noticeable reduction in battery life of the smartphone. Similarly, classification of an audio context can be improved with higher sampling rates from a microphone at a corresponding increase in power consumption.

Another context based application is geo-fencing, which provides information as to whether a smartphone has remained within a predetermined bounded area. In some aspects, a geo-fencing application may necessitate a sampling rate of a GPS receiver consistent with a desired fidelity of the breach detection. Visual classification methods also benefit in reduced latency and improved accuracy with higher sampling or frame rates, with a corresponding increase in power utilization.

Adequate sensing of the environment from a mobile platform may also present a challenge. Some sensors may provide more accurate sensing data if they are within a certain proximity of the environmental factor being sensed. For example, a microphone may be able to capture data of adequate fidelity if it is within a certain distance of an audio source, such as a person speaking. Some sensing applications may detect typing on a keyboard. However, such detection may only be possible if an audio sensor is positioned near a keyboard and not occluded by other objects, such as a shirt pocket or purse.

Another sensing application may determine which particular individuals are proximate to the mobile device. Such an application may be dependent on the positioning of a camera within the smartphone, such that images of the visual environment may be captured and used to classify, for example, participants in a meeting. To provide for adequate images of the visual environment, multiple cameras may be included on a cell phone, such that adequate coverage of the visual environment may be obtained despite an orientation of the smart phone. For example, if the phone is positioned flat on a table, one or more cameras positioned along the phones sides and/or perimeter may still be able to capture the surrounding visual environment. These additional cameras may increase the power consumption of the phone.

To reduce power consumption and improve the ability to sense an environment proximate to a smart phone, the sensing of context may be coordinated among multiple devices. For example, in addition to use of a user's mobile device to sense the user's context, other devices within a proximity of the user may be employed to collect additional data that can also be provided to applications sensing the user's context. Such devices may include other user's mobile devices, laptops, desktop computers, wall-mounted microphones, camera, or video conferencing equipment, etc. These additional devices may be discovered and/or communicated with via existing wireless technologies such as Bluetooth, Bluetooth-LE, Wi-Fi, Wi-Fi direct, Zigbee, light based (such as light modulation based (for example, OFDM visible light modulation) and/or audio based (such as ultrasound) communications, audio environment fingerprints, or the like.

By coordinating the sensing of a user's context across multiple devices, power consumption may be reduced while sensing fidelity improved. For example, some proximate devices may be attached to a stable source of power such as a wall outlet, and may be positioned such that they can provide context information that is "good enough" or potentially superior to those provided by a user's mobile device. Alternatively, the proximate devices may have less stringent battery life constraints than the user's mobile device. For example, a proximate user's smart phone may have 90% battery life remaining while a context sensed user's smart phone only has 10% battery life remaining. In this scenario, it may be advantageous to utilize the proximate user's context sensing capabilities and turn off the capabilities on the user's smart phone whose context is being sensed, thus conserving the remaining battery life.

In some implementations, power consumption may be improved across a NAN by simply sharing a sensing workload across multiple devices. For example, by sharing Bluetooth scanning burdens across multiple devices, detection latency may be reduced while power consumption associated with Bluetooth scanning is also reduced across a plurality of devices on a NAN.

The quality of sensed data may also be improved by sharing context sensing tasks across multiple devices. In some scenarios, a proximate user's phone or other proximate device may be able to provide superior sensing data based on its relative position or perhaps a more clear line of sight to the sensed environment. For example, a first user's phone may be in a briefcase or shirt pocket such that it is unable to sense the visual environment, while a proximate second user, for example, a user in a meeting with the first user, may have a clear line of sight to the meeting area. In some aspects, devices may determine their distance from a sensed context source, and share the distance with other devices on the NAN. A determination of which sensing information is provided by a device may be based, at least in part, on the distance of the device from a sensed context source.

In some aspects, each of the devices in a neighbor aware network may include particular capabilities. For example, at least some of the devices may include capabilities to sense local context information acquired from one or more hardware sensors, such as location, temperature, ambient lighting conditions, ambient sound conditions, ambient atmospheric pressure, or the like. In some aspects, one or more of the devices may include "soft" sensors that determine context information from other information sources. For example, context information may be sensed from data or programs on a user's device, to include a user's calendar or email information, conference room numbers in a meeting invite, or information from social networks such as Facebook or Twitter.

In some aspects, one or more capabilities may each be offered by multiple devices within the neighbor aware network. For example, since microphones are common on mobile devices, multiple devices in a neighbor aware network may have ambient audio sensing capabilities. In some aspects, only one device within the neighbor aware network may have a particular capability. For example, capabilities requiring relatively expensive hardware may be less readily available on a NAN. In some aspects, only one device may have ambient pressure sensing capabilities, for example.

In some aspects, it may be advantageous for the devices to share their capabilities or sensed context information with each other. Some of the devices on the neighbor aware network may not have location capabilities provided by, for example, a GPS receiver. By sharing the location capabilities of a location enabled device on the NAN, a larger number of devices on the NAN can benefit from location capabilities than if the capabilities are not shared.

Capabilities or context information may also be shared between devices to reduce the overall power consumption of devices on the neighbor aware network. Obtaining context information from a sensor may consume more power than receiving the context information from another device. For example, when a first device determines its location using a GPS receiver that is built into the first device, substantial amounts of power can be consumed. Alternatively, if GPS coordinates are received by the first device via a network message from a second GPS enabled device on the NAN, the first device can reduce its power consumption by turning off its GPS receiver. Because the first device is still receiving location information, applications running on the first device can still utilize location services via the location information provided by the second device.

In some aspects, context information may be shared between devices on a NAN based on a power constraint of one or more of the devices (such as a type of power supply in use by the devices, or a remaining battery life of a device). Devices running on battery power may attempt to obtain context information from other devices, such that they can reduce their own power consumption by turning off sensors that collect that context information, and thus extend their battery life. Some devices running on wall power or other more reliable power may be able to offer services or context information to other devices on the NAN. If the wall powered devices provide context information or other services to battery powered devices on the NAN, the overall power utilization of the NAN is improved relative to each device operating independently.

While sharing device capabilities may provide benefits to service or context consuming devices on a NAN, context provider devices may need an incentive to offer their services to other devices on the NAN. In some aspects, a service or context consuming device may "pay" for services it consumes from other devices. The currency used for payment of these services may come in a variety of forms. For example, in some aspects, monetary currency may be exchanged for services. In other aspects, a context consuming device may display advertisements on its user interface on behalf of a context providing device so as to compensate the context providing device for the services it provides. In other aspects, a context consuming device may itself provide other services to a device that is providing it with services. In these aspects, two devices perform a mutually agreeable exchange of services.

To facilitate the providing of services for some form of payment, disclosed are methods and systems utilizing message exchanges between context consuming devices and context providing devices. When requesting services from devices on a NAN, a context consuming device may indicate the type of service or context information requested, and in some aspects, a maximum currency it is willing to "pay" to obtain those services.

The context consuming device may also specify a minimum quality of service (such as a sampling rate or duty cycle) needed to satisfy the request. For example, the context consuming device may seek to collect ambient temperature information at one minute intervals, and be willing to pay no more than 0.0001 U.S. cents for each sample. In some aspects, the discovery query may indicate a minimum accuracy or fidelity of a requested context parameter. For example, if a requested context parameter is location information, the discovery query may indicate that the location information must be accurate within a certain radius. For example, the location information provided should be accurate within five feet or one meter.

Similarly, when a context providing device offers its services in response to a discovery query from the context consuming device, the context providing device may indicate a cost or amount of currency it requires before it will provide the identified services to the context consuming device. The context providing device may also indicate a quality of service (sampling rate or duty cycle) at which it can provide the service for the indicated cost. Alternatively, the context providing device may indicate a series of services, sampling rates, and costs, enabling a context consuming device to select which sampling rate at which cost offers the most value. In some aspects, the response from the context providing device may indicate a minimum accuracy or fidelity of an offered context parameter. For example, if a requested context parameter is location information, the discovery response may indicate that location information provided by the context providing device will be accurate within a certain radius. For example, the location information provided will be accurate within five feet or one meter.

These message exchanges enable the context providing device and context consuming device to establish an electronic "contract" between each other. Once a context consuming device has identified a context providing device that will meet its service and cost parameters, it may accept the offer of services from the context consuming device.

In some other aspects, a context providing device may determine which services it will offer to a context providing device based on what services have already been offered to the context consuming device from other context providing devices. For example, after receiving a discovery query indicating one or more requested context parameters from a context consuming device, a context providing device may wait and listen from responses to the query from other context providing devices on the NAN. After a threshold period of time, the context providing device may determine which of the original context parameters requested by the context consuming device have not yet been offered to the context consuming device by other nodes on the NAN. The context consuming device may then determine which services or contexts it will offer to the context consuming device based on which services remain unfulfilled.

As discussed above, certain of the devices described herein may implement the 802.11ah standard or the 802.11 ac standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1a illustrates an example of a wireless communication system 100. The wireless communication system 100 may operate pursuant to a wireless standard, such as an 802.11 standard. The wireless communication system 100 may include an AP 104, which communicates with STAs. In some aspects, the wireless communication system 100 may include more than one AP. Additionally, the STAs may communicate with other STAs. As an example, a first STA 106a may communicate with a second STA 106b. As another example, a first STA 106a may communicate with a third STA 106c although this communication link is not illustrated in FIG. 1a.

A variety of processes and methods may be used for transmissions in the wireless communication system 100 between the AP 104 and the STAs and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs and between an individual STA, such as the first STA 106a, and another individual STA, such as the second STA 106b, in accordance with CDMA techniques. If this is the case, the wireless communication system 100 may be referred to as a CDMA system.

A communication link may be established between STAs. Some possible communication links between STAs are illustrated in FIG. 1a. As an example, a communication link 112 may facilitate transmission from the first STA 106a to the second STA 106b. Another communication link 114 may facilitate transmission from the second STA 106b to the first STA 106a.

The AP 104 may act as a base station and provide wireless communication coverage in a basic service area (BSA) 102. The AP 104 along with the STAs associated with the AP 104 and that use the AP 104 for communication may be referred to as a basic service set (BSS).

It should be noted that the wireless communication system 100 may not have a central AP 104, but rather may function as a peer-to-peer network between the STAs. Accordingly, the functions of the AP 104 described herein may alternatively be performed by one or more of the STAs.

Figure 1B:
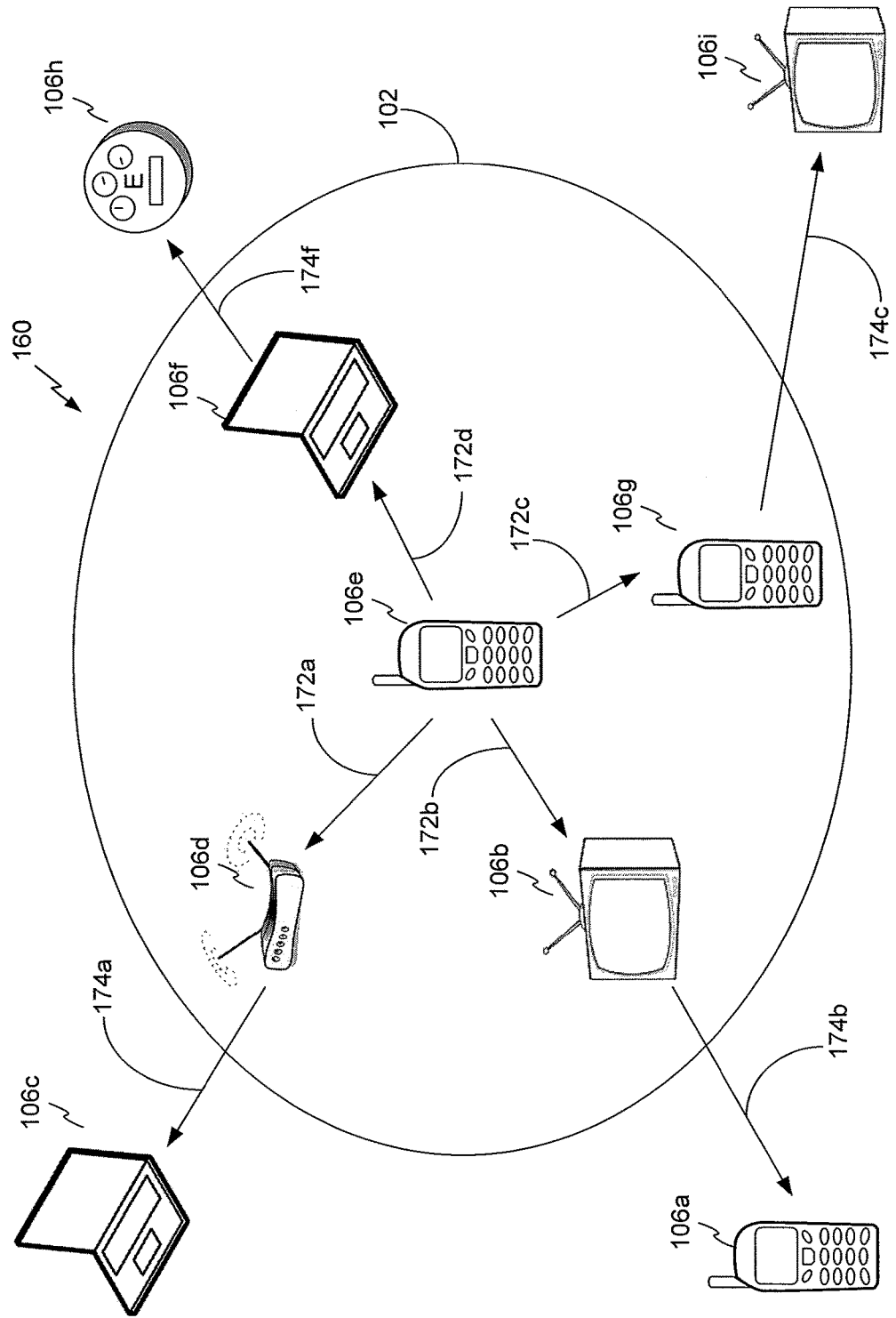
FIG. 1b illustrates another example of a wireless communication system.

FIG. 1b illustrates an example of a wireless communication system 160 that may function as a Neighbor Aware Network (NAN). For example, the wireless communication system 160 in FIG. 1b shows STAs 106a-106i that may communicate with each other without the presence of an AP. As such, the STAs, 106a-106i may be configured to communicate in different ways to coordinate transmission and reception of messages to prevent interference and accomplish various tasks. In one aspect, the networks shown in FIG. 1b may be configured as a "Neighbor Aware Network" or NAN. In one aspect, a NAN may refer to a network for communication between STAs that are located in close proximity to each other. In some cases the STAs operating within the NAN may belong to different network structures (e.g., STAs in different homes or buildings as part of independent LANs with different external network connections).

In some aspects, a communication protocol used for communication between nodes on the neighbor aware network 160 may schedule periods of time during which communication between network nodes may occur. These periods of time when communication occurs between STAs 106a-106i may be known as availability windows. An availability window may include a discovery interval or paging interval as discussed further below.

The protocol may also define other periods of time when no communication between nodes of the network is to occur. In some embodiments, nodes may enter one or more sleep states when the neighbor aware network 160 is not in an availability window. Alternatively, in some embodiments, portions of the stations 106a-i may enter a sleep state when the neighbor aware network is not in an availability window. For example, some stations may include networking hardware that enters a sleep state when the peer to peer network is not in an availability window, while other hardware included in the STA, for example, a hardware processor, an electronic display, or the like do not enter a sleep state when the peer to peer network is not in an availability window.

The neighbor aware network 160 may assign one node to be a root node. In FIG. 1b, the assigned root node is shown as STA 106e. In one aspect of peer to peer network 160, the root node is responsible for periodically transmitting synchronization signals to other nodes in the neighbor aware network. The synchronization signals transmitted by root node 160e may provide a timing reference for other nodes 106a-d and 106f-i to coordinate an availability window during which communication occurs between the nodes. For example, a synchronization message 172a-172d may be transmitted by root node 106e and received by nodes 106b, 106d and 106f-106g. The synchronization message 172 may provide a timing source for the STAs 106b, 106d and 106f-106g. The synchronization message 172 may also provide updates to a schedule for future availability windows. The synchronization messages 172 may also function to notify STAs 106b, 106d and 106f-106g that they are still present in the peer to peer network 160.

Some of the nodes in the neighbor aware network 160 may function as branch synchronization nodes. A branch synchronization node may retransmit both availability window schedule and master clock information received from a root node. In some embodiments, synchronization messages transmitted by a root node may include availability window schedule and master clock information. In these embodiments, the synchronization messages may be retransmitted by the branch synchronization nodes. In FIG. 1b, STAs 106b, 106d and 106f-106g are shown functioning as branch-synchronization nodes in the neighbor aware network 160. STAs 106b, 106d and 106f-106g receive the synchronization message 172a-172d from root node 106e and retransmit the synchronization message as retransmitted synchronization messages 174a-174d. By retransmitting the synchronization message 172 from root node 106e, the branch synchronization nodes 106b, 106d and 106f-106g may extend the range and improve the robustness of the peer to peer network 160.

The retransmitted synchronization messages 174a-174d are received by nodes 106a, 106c, 106h, and 106i. These nodes may be characterized as "leaf" nodes, in that they do not retransmit the synchronization message they receive from either the root node 106e or the branch synchronization nodes 106b, 106d or 106f-106g.

Figure 2:
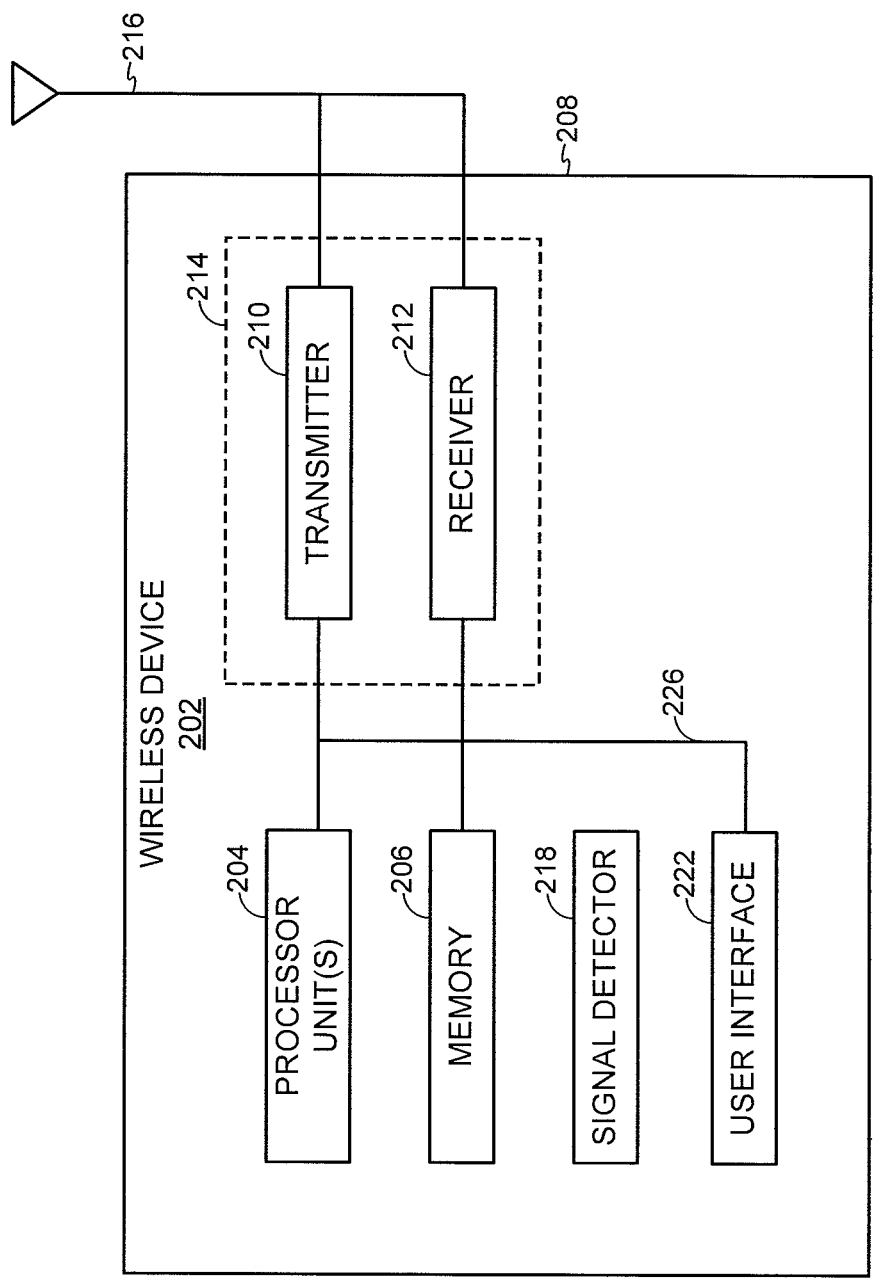
FIG. 2 illustrates a functional block diagram of a wireless device that may be employed within the wireless communication system of FIG. 1a, FIG. 1b, or FIG. 14.

FIG. 2 illustrates various components that may be utilized in a wireless device 202 that may be employed within the wireless communication system 100, 160, or 1400. The wireless device 202 is an example of a device that may be configured to implement the various methods described herein. For example, the wireless device 202 may comprise the AP 104 or one of the STAs.

The wireless device 202 may include a hardware processor 204 which controls operation of the wireless device 202. The hardware processor 204 may also be referred to as a central processing unit (CPU). Memory 206, which may include both read-only memory (ROM) and random access memory (RAM), may provide instructions and data to the hardware processor 204. A portion of the memory 206 may also include non-volatile random access memory (NVRAM). The hardware processor 204 typically performs logical and arithmetic operations based on program instructions stored within the memory 206. The instructions in the memory 206 may be executable to implement the methods described herein.

The hardware processor 204 may comprise or be a component of a processing system implemented with one or more hardware processors. The one or more hardware processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more hardware processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the hardware processor 204. When the wireless device 202 is implemented or used as an AP 104 or STA 106, the hardware processor 204 may be configured to process packets of a plurality of different packet types. For example, the hardware processor 204 may be configured to determine the type of packet and to process the packet and/or fields of the packet accordingly. When the wireless device 202 is implemented or used as an AP 104, the hardware processor 204 may also be configured to select and generate one of a plurality of packet types. For example, the hardware processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the hardware processor 204 may be used to implement not only the functionality described above with respect to the hardware processor 204, but also to implement the functionality described above with respect to the signal detector 218 and/or the DSP 220. Further, each of the components illustrated in FIG. 2 may be implemented using a plurality of separate elements.

Devices, such as STAs, 106a-i shown in FIG. 1b, for example, may be used for neighborhood-aware networking, or NANing. For example, various stations within the network may communicate on a device to device (e.g., peer-to-peer communications) basis with one another regarding applications that each of the stations supports. A discovery protocol may be used in a NAN to enable STAs to advertise themselves (e.g., by sending discovery packets) as well as discover services provided by other STAs (e.g., by sending paging or query packets), while ensuring secure communication and low power consumption.

In a neighborhood-aware or NAN, one device, such as STA or wireless device 202, in the network may be designated as the root device or node. In some embodiments, the root device may be an ordinary device, like the other devices in the network, rather than a specialized device such as a router. In NAN, the root node may be responsible for periodically transmitting synchronization messages, or synchronization signals or frames, to other nodes in the network. The synchronization messages transmitted by root node may provide a timing reference for other nodes to coordinate an availability window during which communication occurs between the nodes. The synchronization message may also provide updates to a schedule for future availability windows. The synchronization messages may also function to notify STAs that they are still present in the peer to peer network.

In a Neighbor Aware Network (NAN), STA's on the network may use synchronization messages transmitted by a root STA and retransmitted by branch STA's in order to determine availability windows. During these availability windows, STA's in the NAN may be configured to transmit and/or receive messages from other STA's on the network. At other times, STA's, or portions of STA's, on the NAN may be in a sleep state. For example, an STA on a NAN, such as wireless device 202, may enter a sleep state based at least in part on synchronization messages received from a root node. In some embodiments, STA's on a NAN may enter a sleep mode, where one or more elements of the STA may enter a sleep mode, rather than the entire STA. For example, STA 202 may enter a sleep mode where the transmitter 210, receiver 212, and/or transceiver 214 may enter a sleep mode based on synchronization messages received on a NAN. This sleep mode may enable the STA 202 to conserve power or battery life.

Figure 3A:
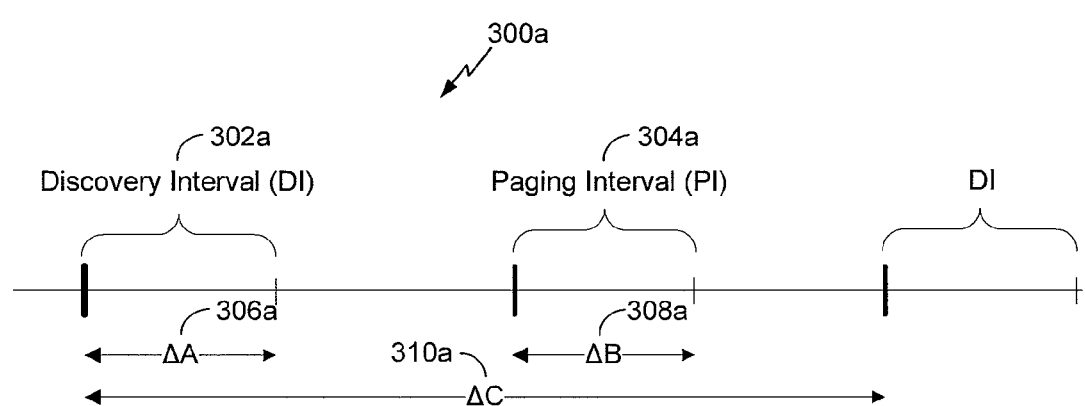
FIG. 3a illustrates an exemplary communication timeline in a wireless communication system in accordance with aspects of the present disclosure.

FIG. 3a illustrates an exemplary communication timeline 300a in a wireless communication system where STAs may communicate via one channel. In one aspect, the communication according to the timeline shown in FIG. 3a may be used in an ad-hoc wireless network, such as the network shown in FIG. 1a or FIG. 1b. The exemplary communication timeline 300a may include a discovery interval (DI) 302a of a time duration ΔA 306a, a paging interval (PI) 304a of a time duration ΔB 308a, and an overall interval of a time duration ΔC 310a. In some aspects, communications may occur via other channels as well. Time increases horizontally across the page over the time axis.

During the DI 302a, APs or STAs may advertise services through broadcast messages such as discovery packets. APs or STAs may listen to broadcast messages transmitted by other APs or STAs. In some aspects, the duration of DIs may vary over time. In other aspects, the duration of the DI may remain fixed over a period of time. The end of the DI 302a may be separated from the beginning of the subsequent PI 304a by a first remainder period of time as illustrated in FIG. 3a. The end of the PI 304a may be separated from the beginning of a subsequent DI by a different remainder period of time as illustrated in FIG. 3a. However, different combinations of remainder time periods are contemplated.

During the PI 304a, APs or STAs may indicate interest in one or more of a plurality of services advertised in a broadcast message by transmitting paging request messages such as paging request packets. APs or STAs may listen to paging request messages transmitted by other APs or STAs. In some aspects, the duration of the PI may vary over time. In other aspects, the duration of the PI may remain constant over a period of time. In some aspects, the duration of the PI may be less than the duration of the DI.

The overall interval of duration ΔC 310a may measure the period of time from the beginning of one DI to the beginning of a subsequent DI as illustrated in FIG. 3a. In some aspects, the duration of the overall interval may vary over time. In other aspects, the duration of the overall interval may remain constant over a period of time. At the conclusion of the overall interval of duration ΔC 310a, another overall interval may begin, including a DI, a PI, and the remainder intervals. Consecutive overall intervals may follow indefinitely or continue for a fixed period of time.

A STA may enter a sleep or power-save mode when the STA is not transmitting or listening or is not expecting to transmit or listen. As an example, the STA may sleep during periods other than the DI or PI. The STA in the sleep mode or power-save mode may awake or return to normal operation or full power mode at the beginning of the DI or PI to enable transmission or listening by the STA. In some aspects, the STA may awake or return to normal operation or full power mode at other times when the STA expects to communicate with another device, or as a result of receiving a notification packet instructing the STA to awake. The STA may awake early to ensure that the STA receives a transmission.

As described above, during the DI, APs or STAs may transmit discovery packets (DPs). During the PI, APs or STAs may transmit paging request packets (PRs). A DP may be a packet configured to advertise a plurality of services provided by a STA or AP and to indicate when the paging interval is for the device that transmits the discovery packet. The DP may include a data frame, management frame, or management action frame. The DP may carry information generated by a higher layer discovery protocol or an application based discovery protocol. The PR may be a packet configured to indicate interest in at least one of the plurality of services provided by an AP or STA.

The start and end of the DI and PI may be known via numerous methods to each STA desiring to transmit a discovery packet or a paging request packet. In some aspects, each STA may synchronize its clock with the other APs or STAs and set a shared DI and PI start time and DI duration and PI duration. In other aspects, a device may send a signal such as a special clear to send (S-CTS) signal to clear the medium of legacy communications, such as communications that may conflict or not be compliant with aspects of the present disclosure, and indicate the beginning and duration of the DI or PI period, as well as additional information about the DI and PI durations.

A STA potentially interested in services advertised via discovery packets, such as from other STAs, may awake or remain awake during the DI and process discovery packets to determine if a particular discovery packet includes information about one or more of a plurality of services that may be of interest to the receiving STA. After the DI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next PI. At the beginning of the PI, the interested STA may awake to transmit a paging request packet to the provider of the service.

A STA waiting for a response to a transmitted discovery packet, such as discovery packets transmitted to other STAs, may awake or remain awake during the PI and process paging request packets to determine if a particular paging request packet indicates interest by another device in at least one of plurality of services provided by the STA. After the PI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next DI.

As examples, the duration ΔC of the overall interval may equal approximately one to five seconds in some aspects. In other aspects, the overall interval may be less than one second or more than five seconds. The duration ΔA of the DI may equal approximately 16 milliseconds in some aspects while more or less than 16 milliseconds in other aspects. The duration ΔB of the PI may equal approximately the duration ΔA in some aspects. In other aspects, the duration ΔB may be more or less than the duration ΔA.

Figures 3B, 3C:
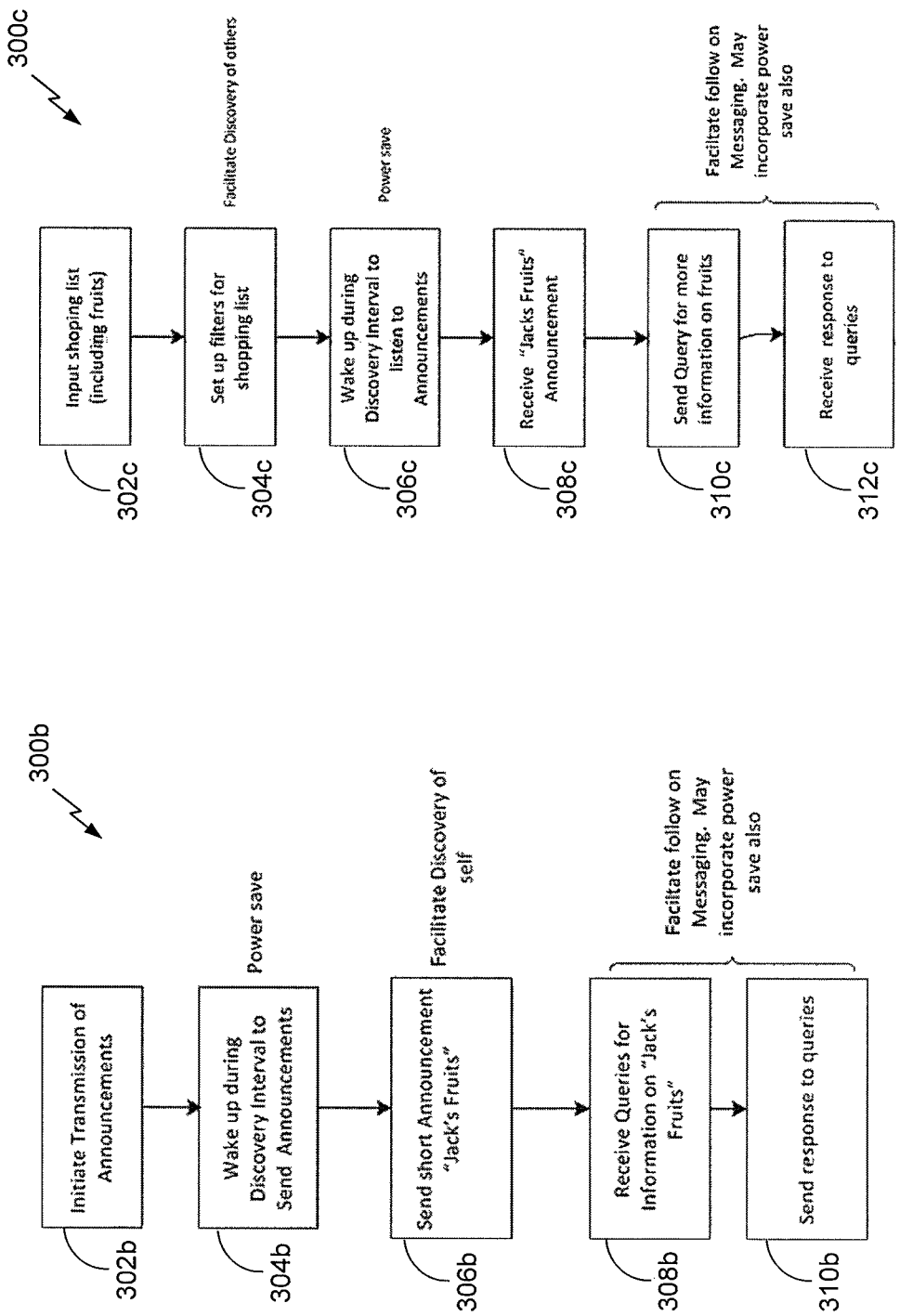
FIG. 3b is a flowchart of an exemplary process of discovering devices in a wireless communication system in accordance with aspects of the present disclosure.
FIG. 3c is a flowchart of an exemplary process of querying devices in a wireless communication system in accordance with aspects of the present disclosure.

FIG. 3b is a flowchart of an exemplary process 300b of discovering devices in a wireless communication system. The process 300b may be used to introduce two devices, such as two STAs and 106b. For example, a STA may advertise information about one or more of a plurality of services that may be of interest to various other STAs to which the information is directed. In some embodiments, a service offered by a STA may include a service offered by an application (e.g., a gaming application, a shopping application, a social networking application, etc.) that a user has downloaded or that is native to the STA. For example, a user of the STA may want to invite other users of the application to interact with the user via the application. At block 302b, the STA may initiate transmission of announcements. Each announcement may include a discovery packet or message including the information relating to the one or more services. At block 304b, the STA may wake up from a power-save mode or sleep mode during a discovery interval to send announcements to one or more STAs. At block 306b, the STA may send one or more short announcements regarding a particular service, such as "Jack's Fruits," in order to facilitate discovery of the STA. The short announcements may include a discovery packet or message. The receiving STAs that are interested in the one or more services advertised by the STA may respond with a paging request (or query request) packet or message that indicates interest in the service provided by the STA. Whether an STA is "interested" in the one or more services may be based on one or more parameters. For example, configuration data may store a list of services a device is "interested" in. The configuration data may be based on a user's preferences for services. These preferences may be received via a user interface or network connection. For example, the user's preferences may be initialized when a mobile device is provisioned. The user's preferences for services may be stored in configuration data. The configuration data may define one or more criteria that can be used to evaluate a service to determine whether the service is of interest to the device.

At block 308b, the STA may receive queries (e.g., a paging or query request) for information on the particular service, such as "Jack's Fruits." In response, at block 310b, the STA may send a response to the queries. Follow on messaging between the STA and the various querying STAs may occur. The STA and the various STAs may enter power-save mode or sleep mode in the intervals between the exchanges of messages between the STAs. The receiving may be performed by receiver 212 or the transceiver 214, for example, and the transmitting may be performed by the transmitter 210 or the transceiver 214, for example.

FIG. 3c is a flowchart of an exemplary process 300c of querying devices in a wireless communication system in accordance with aspects of the present disclosure. At block 302c, a STA may input a shopping list, which may include various vendors that a user of the STA may have an interest. For example, a user may download a shopping list from the Internet. Although the process 300c is described with respect to a shopping application, those having ordinary skill in the art will appreciate that the process 300c applies to other applications, such as gaming applications, social networking applications, etc. At block 304c, the STA may set up filters for the shopping list. For example, a filter may be set up to allow the STA to wake up from a power-save mode or sleep mode only when a discovery packet or message is received for particular vendors or applications. At block 306c, the STA may wake up during a discovery interval to listen to announcements. Each announcement may include a discovery packet or message including information relating to one or more services offered by one or more other STAs. At block 308c, the STA may receive an announcement from a second STA, such as a "Jack's Fruits" announcement. The STA may determine whether it is interested in one or more sets of information related to the announcement and may respond with a paging request (or query request) packet or message that indicates its interest in the information. For example, if the STA is interested in a particular sale item offered by the second STA, the STA may respond with a paging request (or query request) packet or message. At block 310c, the STA sends a query for more information relating to the announcement, such as more information on Jack's Fruits. At block 312c, the STA may receive a response to one or more queries that the STA sent to other STAs regarding services offered by the other STAs.

It is desirable for the STAs described above (e.g., using a discovery protocol used in a NAN network) to be able to advertise themselves, as well as discover services provided by other STAs, using a secure communication protocol and while keeping power consumption low. For example, it is desirable for a STA to advertise its offered services by securely sending discovery packets or messages and for the STA to discover services offered by other STAs by securely sending paging or query packets or messages while avoiding excess power consumption. For example in accordance with certain embodiments, STAs may "sleep" a majority of a time period and wake up for short discovery intervals as described to decrease power consumption. There may be certain conditions that allow the STAs to make use of short time intervals to decrease power consumption while still effectively allowing discovery and advertisement of services within the network. For example, it is desirable that STAs that transmit during the short time intervals "know" that intended receivers are active to receive the transmitting messages. In addition, it is further desirable that STAs that are searching for different services advertised by another STA 106 activate their receivers at the appropriate time to receive messages advertising services from other STAs. As such, certain embodiments described herein are directed to synchronization between different STAs to allow for performing device discovery as described above and for synchronization of other communications while allowing for reduced power consumption. For example certain embodiments are directed to synchronization so that STAs are activated for transmitting and receiving at the same time.

Furthermore, when STAs communicate without a central coordinator, such as an AP 104, synchronization of communications between the STAs may be desirable. As just described, if the STAs are not synchronized, the STAs may not receive discovery messages within the discovery interval, or be able to transmit paging requests within the correct paging interval to be received by other STAs. Synchronization therefore may provide a common reference time that may be used to determine timing of communication intervals such as the discovery interval 302a and the paging interval 304a. As each STA 106 operates independently of the other STAs, each generating an individual clock signal, the clock signal may become out of sync. For example, if a STA 106 is in a "doze" state, the clock signal may drift and define a reference time value that is faster or slower as compared to other clocks signals of other STAs.

Certain aspects described herein are directed to devices and methods for synchronization of clock signals of STAs operating in an ad-hoc fashion. In one aspect, at least some of the STAs may transmit the current time value of their clock signals to the other STAs. For example, in accordance with certain embodiments, STAs may periodically transmit a 'sync' frame that carries a time stamp. The current time value may correspond to a time-stamp value. For example, in one embodiment, a discovery message as described above may serve as the 'sync' frame and carry a current time value of a STA 106. In addition to the time stamp, the sync frame may also include information regarding the discovery interval and discovery period. For example, the sync frame may include the schedule of the discovery interval and discovery period. In some embodiments, the sync frame may also include information identifying a device to generate prospective synchronization messages. For example, an indication of a back-up root node may be included in the sync frame.

Upon receipt of a sync frame, a STA 106 that may be new to the network may determine the time and the discovery interval/discovery period schedule in the network. STAs already communicating within the network may maintain synchronization while overcoming clock drift as described below. Based on the sync message, STAs may enter and exit a network (e.g., a NAN) without losing synchronization. Furthermore, the synchronization messages described herein may allow for avoiding excessive power drain and the STAs in the network may share the burden of messaging for synchronization. Furthermore, certain embodiments allow for a low messaging overhead (e.g., as only a few devices may send sync frames in every discovery period as will be described below). As described above with reference to FIG. 3A, discovery packets within a NAN are transmitted during a discovery interval 302a that occurs every discovery period. As such, sync messages may be sent during a discovery interval 302a for certain discovery periods.

It should be appreciated that a STA 106 may not transmit a sync frame every discovery interval. Rather, a probability value (P_sync), as is further described below, may be used to determine whether the STA 106 transmits and/or prepares a sync frame. As such, while at least some sync frames are sent for every discovery interval, not all the STAs participating in the NAN transmit a sync frame for every discovery interval. This may allow for reduced power consumption in transmitting sync frames while still enabling synchronization.

Figure 4:
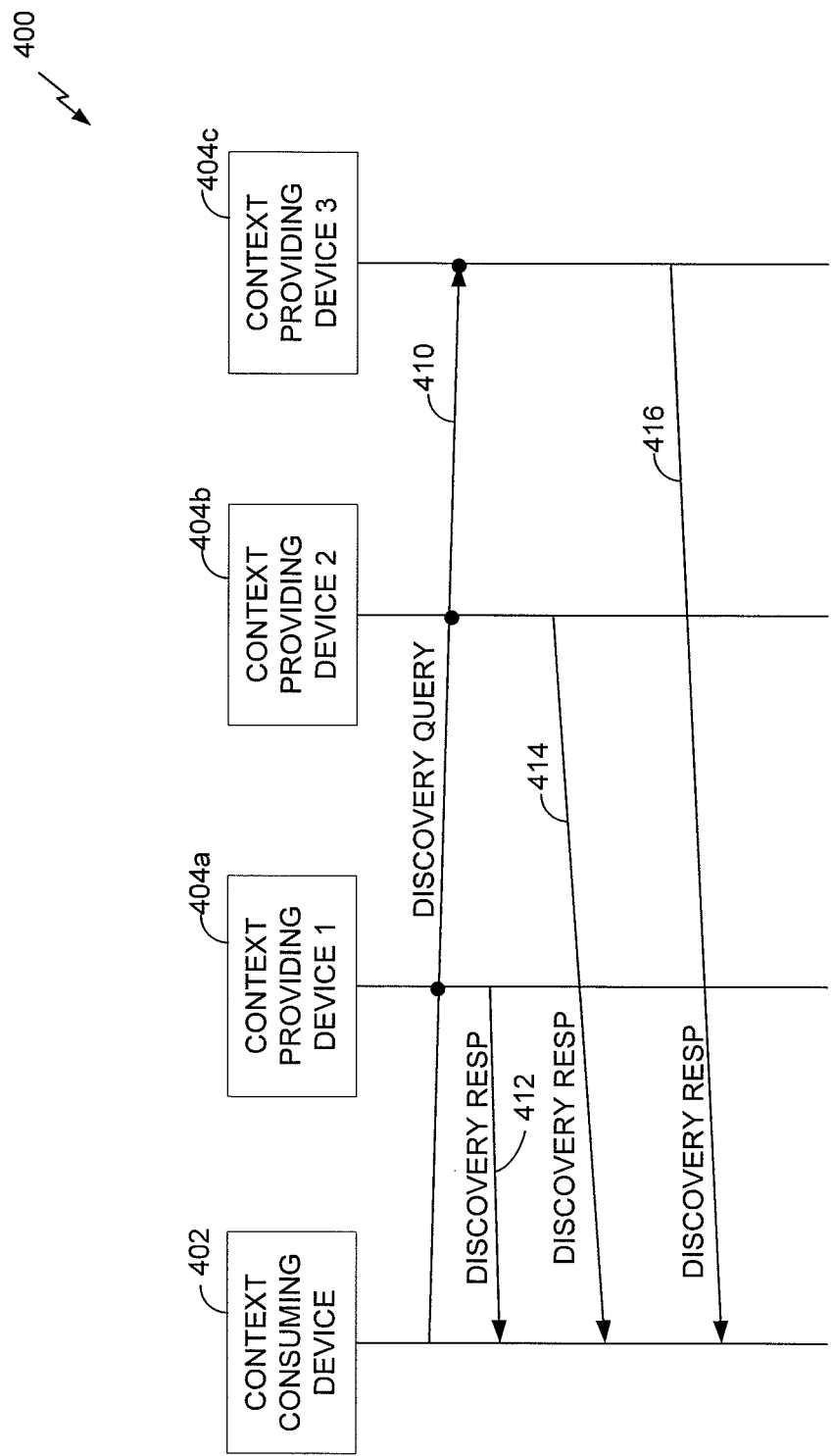
FIG. 4 is a sequence diagram showing one example of a discovery query and response message exchange on a neighbor aware network.

FIG. 4 is a sequence diagram showing one example of a discovery query and response message exchange on a neighbor aware network. The illustrated message sequence enables a context providing device, specifically context providing device 3 404c and to some extend context providing device 2 404b, to better optimize their response to a discovery query transmitted by a context consuming device. The responses can be optimized (or at least improved) by tailoring the response based on responses provided by other context providing devices on the NAN. For example, a context providing device may determine which of a set of requested context parameters remain unsatisfied after other devices have transmitted responses to a discovery query. The context providing device may then determine which of the missing context parameters it can provide, and include those in its own response.

In some aspects, the context providing device may also determine cost information associated with context parameters being provided by other devices. For example, discovery responses in some embodiments may not only indicate particular context parameters that can be provided, but what cost will be "charged" for providing those parameters. By listening to those responses, a context providing device may adjust cost information it includes in its own response to be "competitive" with costs offered by other devices.

The sequence diagram shows four devices, including a context consuming device 402, and three context providing devices 404a-c. FIG. 4 shows the context consuming device 402 transmitting a discovery query message 410 on the network 400. In the illustrated aspect, the discovery message may be multicast or broadcast over the network 400 such that at least all three context providing devices 404a-c receive the discovery query message. In some other aspects, the discovery query may be transmitted via unicast addressing. In these aspects, the discovery query message may be transmitted three times, once for each context providing device.

The discovery query message identifies one or more services or contexts requested by the context consuming device 402. For example, the context consuming device 402 may request local context information such as ambient lighting, ambient atmospheric pressure, ambient temperature, location information, or other context information from hardware sensors or soft sensors as described above. In some aspects, the discovery query may also indicate one or more quality of service parameters associated with one or more of the context parameters. For example, context consuming device 402 may not only indicate that it needs location context information, but that it must be accurate within three feet.

In response to receiving the discovery query message, context providing device 404a transmits a discovery response message 412 to the context consuming device 402. The discovery response message may identify one or more of the contexts requested by the discovery query message 410 that can be provided by context providing device 404a. The discovery response message 412 may also include one or more services or contexts that can be provided to context consuming device 402 that were not requested by the context consuming device 402 when it transmitted the discovery query 410. Note that although FIG. 4 shows the discovery response message being transmitted from context providing device 1 404a to context consuming device 402, the discovery response message 412 may be received by other context providing devices, such as devices 404b-c. For example, at least one of context providing devices 404b-c may employ networking "sniffing" technology to receive network messages that are not addressed specifically to them, but are physically receivable from the wireless network. For example, if a destination MAC address is ignored or otherwise bypassed as part of a message receiving process, other device may "sniff" the wireless network and receive and decode other device's discovery responses.

In response to receiving the discovery query message 410, context providing device 2 404b also transmits a discovery response message 414 to the context consuming device 402. Note again that although discovery response message 414 may use unicast addressing and be addressed only to context consuming device 402, at least context providing devices 1 and/or 2 (404a and 404c) may also receive the discovery response message 414, again, as one example via network sniffing technology. In some other aspects, the discovery response message 414 may be multicast or broadcast on the network 400. The discovery response message 414 also indicates context services that may be provided to context consuming device 402. In some aspects, the discovery response 414 may also indicate one or more services or contexts that can be provided to context consuming device 402 that were not indicated or requested in the discovery query message 410.

In some aspects, context providing device 3 404c receives each of the discovery query message 410, discovery response 412, and discovery response 414. Context providing device 3 may then determine, based on the context parameters requested by discovery query 410 and by context parameters offered as available to the context consuming device 402 by either context providing device 1 (through discovery response 412) or by context providing device 2 (through discovery response 414), which requested context parameters remain unsatisfied. Context providing device 3 404c may then determine, based on its own capabilities for example, which of the remaining unsatisfied requested context parameters it will offer to provide to context consuming device 402. In this way, in some aspects, context providing device 3 404c refrains from offering redundant context parameters to context consuming device 402. Alternatively, as discussed above, context providing device 3 404c may adapt portions of its own response to make its "offering" more competitive when compared to the "offerings" provided by responses 410 and/or 414.

Context providing device 3 404c may then transmit discovery response message 416 to context consuming device 402, the response indicating one or more context parameters that can be offered by the device 404c. In some aspects, the response also indicates one or more quality of service parameters associated with one or more of the offered context parameters. In some aspects, the offered context parameters were not offered by either context providing device 1 404a or context providing device 2 404b.

Figure 5:
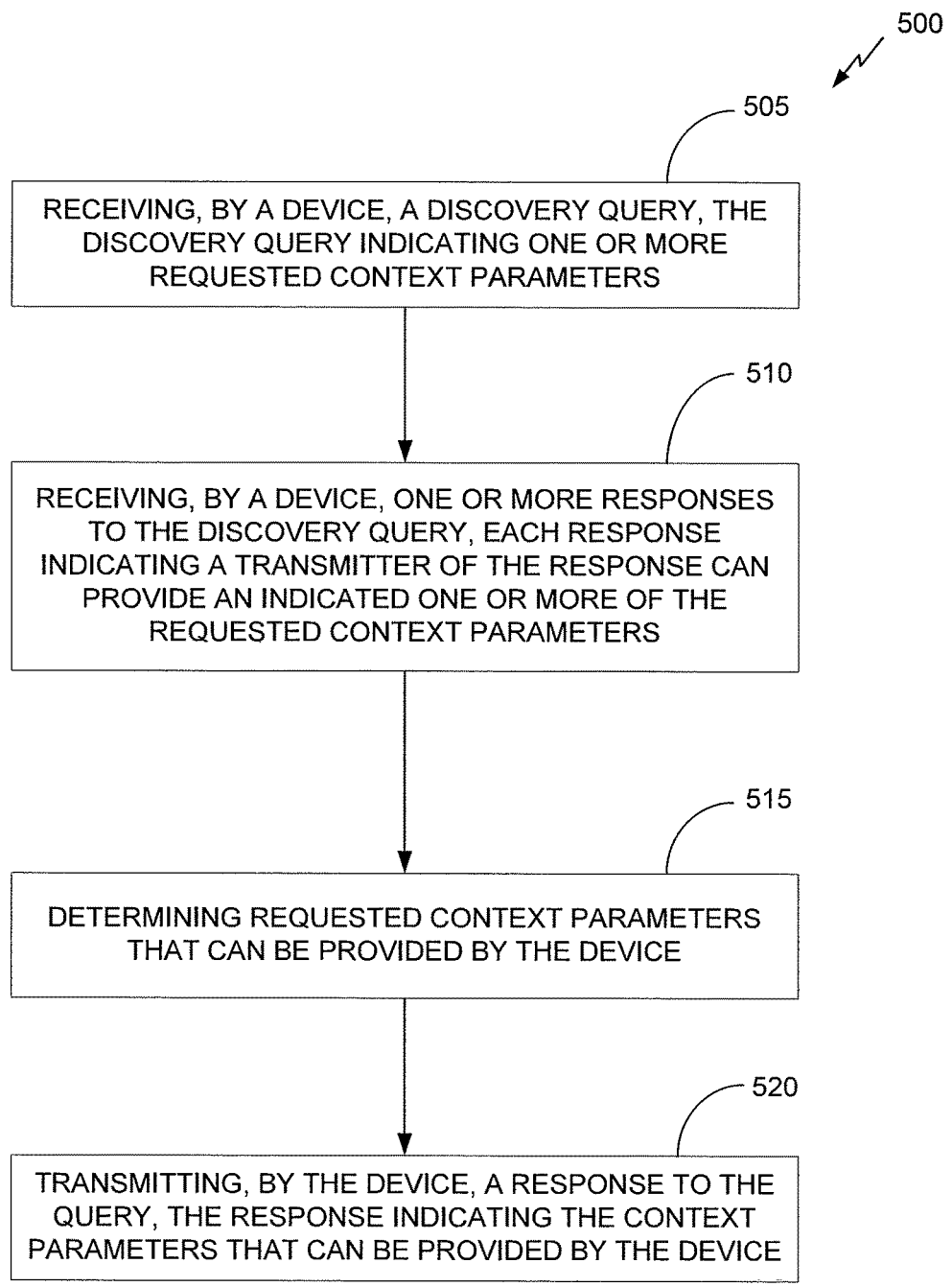
FIG. 5 is a flowchart of an exemplary method of sharing context information between wireless devices on a neighbor aware network.

FIG. 5 is a flowchart of an exemplary method of sharing context information between wireless devices on a neighbor aware network. For example, process 500 may be performed by a context providing device, such as one or more of devices 404a-c, illustrated in FIG. 4. Process 500 may be performed, in some aspects, by wireless device 202. In some aspects, process 500 provides for an optimization of a response to a discovery query received from a context consuming device. In some aspects, services offered to the context consuming device are tailored based on responses provided by other context providing devices. In some aspects, process 500 may include one or more of the functions of process 700, described below with respect to FIG. 6, process 1100, described below with respect to FIG. 11, or process 1300, described below with respect to FIG. 13.

In block 505, a device receives a discovery query. In some aspects, the reception of the discovery query is performed by the receiver 212 and/or the processor 204. The discovery query may be decoded to determine one or more requested context parameters. The coding may be performed, in some aspects, by the processor 204.

In an aspect, the context parameters are local context parameters, in that the context parameters relate to a location of the neighbor aware network. For example, local context parameters may include one or more of audio, location, identity, ambient lighting, ambient atmospheric pressure, or ambient temperature, or other information from hardware or "soft" sensors as described above. In some aspects, the received discovery query may also indicate a requested quality of service (such as a sampling rate or duty cycle) for one or more of the requested context parameters. For example, the requesting device may request to obtain ambient temperature context information once per minute in some aspects. In some aspects, the discovery query may indicate a minimum accuracy or fidelity of a requested context parameter. For example, if a requested context parameter is location information, the discovery query may indicate that the location information must be accurate within a certain radius. For example, the location information provided should be accurate within five feet or one meter. In an aspect, the discovery query further indicates a keyword associated with a requested context parameter. For example, the keyword may identify the requested context parameter.

In block 510, the device receives one or more responses to the discovery query, each response indicating that a device transmitting the response can provide an indicated one or more of the requested context parameters. The reception of the one or more responses may be performed, in some aspects, by the receiver 212 and/or the processor 204. Each response may be decoded in some aspects by the processor 204.

In some aspects, the response may be further decoded to identify a quality of service (such as a sampling rate or duty cycle) that can be provided for one or more of the offered context parameters. In some aspects, the discovery response may indicate a minimum accuracy or fidelity of an offered context parameter. For example, if a context parameter that can be provided is location information, the response to the discovery query may indicate that the location information that can be provided is accurate within a certain radius. For example, the location information provided will be accurate within five feet or one meter.

In an aspect of block 510, a device performing process 500 determines a set of outstanding context parameters based on the requested context parameters and the context parameters indicated in the responses. In some aspects, the outstanding context parameters are determined by subtracting the context parameters indicated in the responses from the requested context parameters. In other words, the device determines which context parameters are still "needed" by the device that initiated the discovery query, even after all the other responses are processed. Block 510 may not be performed in all aspects of method 500.

In block 515, requested context parameters that can be provided by the device performing process 500 are determined. In some aspects, block 515 may be performed by the processor 204. In an aspect, the requested context parameters that can be provided by the device are determined based on the device's context capabilities. In some aspects that perform block 510 for example, the requested context parameters may be further based on the outstanding context parameters. In an aspect, the context parameters that can be provided by the device are based on an intersection of the device's context capabilities and the outstanding context parameters.

Devices capabilities may include a variety of aspects of the device. For example, whether a device includes particular hardware to sensor one or more context parameters may be indicated by the device's capabilities. Some devices may include one or more of a temperature sensor, ambient light sensor, GPS receiver, pressure sensor, etc. To the extent a device is unable to sense a context parameter, the context parameter will not be reflected in the device's capabilities and will not be included in a set of context parameters that can be provided.

In some aspects of block 515, a set of context parameters a device can provide to other devices may be based on a power constraint of the device. For example, some services or context information may only be made available to other devices when the device is operating on power provided via a wall outlet or other reliable source of power. In some aspects, when the device is relying solely on battery power, some services or context information may not be offered to other devices on the neighbor aware network. For example, because obtaining GPS location information can consume substantial amounts of power in some aspects, some devices may conditionally offer to provide location data to other devices on a neighbor aware network only if they are not operating on battery power alone.

In block 520, a response to the discovery query is transmitted by the device. The transmission may be performed in some aspects by the transmitter 210 and/or the processor 204. The response indicates the context parameters that can be provided by the device. In an aspect, the response indicates information for establishing a secure communication channel between the transmitter of the response and a discovery query transmitter. In some aspects, the response indicates a context parameter available from the device that was not included in the requested context parameters. In some aspects, the response indicates quality of service information for one or more of the context parameters that can be provided. For example, the response may indicate a sampling rate, duty cycle, or an availability time for one or more of the requested context parameters. In some aspects, the response indicates one or more costs associated with providing the requested context parameters. In various aspects, a cost associated with providing a requested context parameter may be represented in a variety of different units of currency. In some aspects, the cost may be represented as a monetary currency, such as United States dollars or the European Union Euro. In some aspects, the currency may be represented as an amount of space on a user interface of a context consuming device that must be made accessible for display by other entities in exchange for the requested services or contexts. For example, in some aspects, the display of advertising on a user interface of a context consuming device may be exchanged for one or more contexts or services. In another aspect, the currency units may be an amount of other contexts requested by the context providing device. In these aspects, an exchange of context information can satisfy the cost parameters of the requested service. For example, the service exchange currency may specify the type of context, quality of service (such as a sampling rate or duty cycle) that may be necessary in exchange for a requested context or service.

Figure 6:
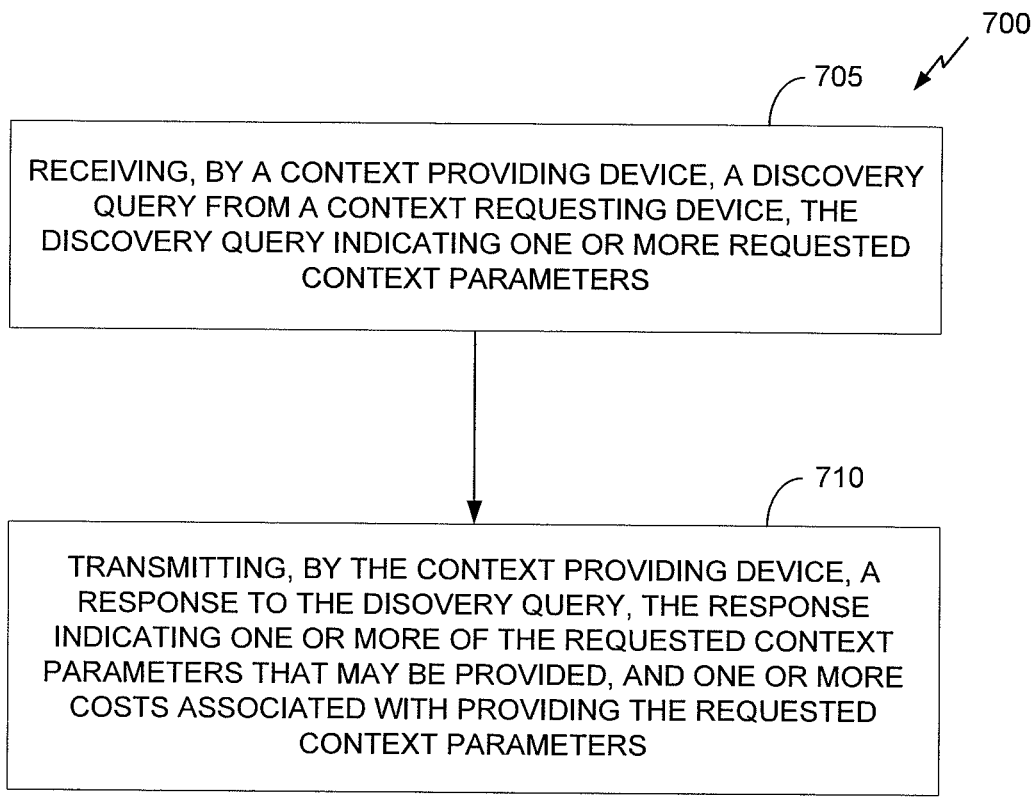
FIG. 6 is a flowchart of an exemplary method of contracting for context information services between wireless devices on a neighbor aware network

FIG. 6 is a flowchart of an exemplary method of contracting for context information services between wireless devices on a neighbor aware network. In some aspects, the method 700 may be performed by the device 202 of FIG. 2. The method 700 may be utilized by a device to provide services, such as local context information, to another device on the neighbor aware network in exchange for payment in some form of currency. In some aspects, process 700 may include one or more of the functions of process 500, described above with respect to FIG. 5. The description of process 700 refers to a context providing device and a context requesting device. In some aspects, a context providing device may be any device. In some aspects, a context consuming device may be any device. In some aspects, a context requesting device is a device that transmits a discovery query. In some aspects, a context providing device is a device that transmits a response to the discovery query. In some aspects, process 700 may be combined with portions of, or incorporate completely, one or more of processes 500, 1100, or 1300.

In block 705, a context providing device receives a discovery query from a context consuming device, the discovery query indicating one or more requested context parameters. In some aspects, the discovery query may be received by the receiver 212 and/or the processor 204. In some aspects, the discovery query may be decoded by the hardware processor 204. In an aspect, the discovery query further indicates a requested quality of service (such as a sampling rate or duty cycle) of at least one of the requested context parameters.

In some aspects, the discovery query further indicates a maximum allowed cost of one or more of the requested context parameters. In some aspects, the requested context parameters represent local context information, in that the context parameters relate to environmental conditions within an area that is a threshold distance from at least one node in the neighbor aware network. Local context information may also include information acquired from one or more "soft" sensors as described above. In some aspects, the discovery query further indicates a keyword associated with a requested context parameter.

In an aspect, the maximum allowed cost may be represented as a variety of different units of currency. In some aspects, the maximum allowed cost may be represented as a monetary currency, such as United States dollars or the European Union Euro. In some aspects, the currency may be represented as an amount of space on a user interface of a context consuming device that must be made accessible for display by other entities in exchange for the requested services or contexts. For example, in some aspects, the display of advertising on a user interface of a context consuming device may be exchanged for one or more contexts or services. In another aspect, the currency units may be an amount of other contexts requested by the context providing device. In these aspects, an exchange of context information can satisfy the cost parameters of the requested service. For example, the service exchange currency may specify the type of context, quality of service (such as a sampling rate or duty cycle) that may be necessary in exchange for a requested context or service.

In block 710, the context providing device transmits a response to the discovery query, the response indicating one or more of the requested context parameters that may be provided, and one or more costs associated with providing the requested context parameters. In some aspects, the transmission of the response is performed by the transmitter 210 and/or the processor 204. Generally, the one or more costs indicated in the response should be less than any maximums indicated in the discovery query, although in some implementations, one or more of the costs may exceed corresponding maximums indicated in the discovery query.

In various aspects, a cost associated with providing a requested context parameter may be represented in a variety of different units of currency. In some aspects, the cost may be represented as a monetary currency, such as United States dollars or the European Union Euro. In some aspects, the currency may be represented as an amount of space on a user interface of a context consuming device that must be made accessible for display by other entities in exchange for the requested services or contexts. For example, in some aspects, the display of advertising on a user interface of a context consuming device may be exchanged for one or more contexts or services. In another aspect, the currency units may be an amount of other contexts requested by the context providing device. In these aspects, an exchange of context information can satisfy the cost parameters of the requested service. For example, the service exchange currency may specify the type of context, quality of service (such as a sampling rate or duty cycle) that may be necessary in exchange for a requested context or service.

In an aspect, the response further indicates one or more values of the requested context parameters. For example, sample data may be provided in the response. This may especially be the case when there is no cost associated with providing the service. In this case, there may be no need for an acceptance protocol to occur between a context consuming device and context providing device before an exchange of context information may begin.

In an aspect, the response further indicates quality of service parameters for one or more of the requested context parameters. For example, in an aspect, the response may indicate a quality of service (such as a sampling rate or duty cycle) of a context parameter that can be provided by the context providing device. In some aspects, quality of service parameters may also include parameters indicative of the accuracy or fidelity of a context parameter that can be provided, and may also be indicated by the response. For example, if one of the context parameters that can be provided is location information, the response may indicate that the location information will be accurate to within 25 feet. Quality of service parameters may also include, in some aspects, an availability time for one or more of the requested context parameters. For example, the response may indicate that a context parameter can be made available after an indicated elapsed time. In some aspects, the availability time may be indicated relative to a reference clock, for example, a clock used to synchronize availability windows on the neighbor aware network.

In some aspects, the response further indicates information for establishing a secure communication channel between the context providing device and the context consuming device. For example, the response may include a public key to use when communicating with the context providing device. The response may also include in some aspects information relating to a group key sharing scheme that may be used to secure a channel of communication between the context consuming device and context providing device. In some aspects, the response further indicates a context parameter available from the context providing device that was not included in the requested context parameters. For example, in some aspects, some devices may offer unsolicited music, video, or local search services to other devices on the neighbor aware network.

Figure 7:
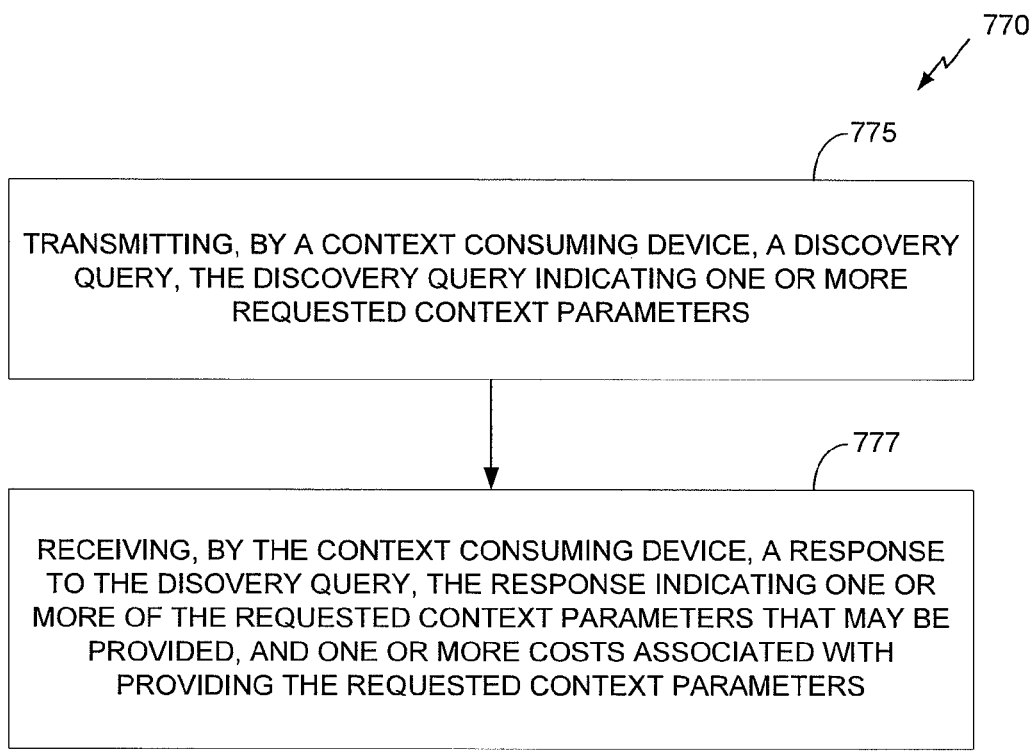
FIG. 7 is a flowchart of an exemplary method of contracting for context information services between wireless devices on a neighbor aware network

FIG. 7 is a flowchart of an exemplary method of contracting for context information or other services between wireless devices on a neighbor aware network. In some aspects, the method 770 may be performed by the device 202 of FIG. 2. In an aspect, the method 770 may be utilized by a device to obtain services, such as local context information, from other devices on the neighbor aware network in exchange for payment in some form of currency. In some aspects, process 770 may include one or more of the functions of process 900, described below with respect to FIG. 9, and/or one or more of the functions of process 1200, described below with respect to FIG. 12.

In block 775, a context consuming device transmits a discovery query, the discovery query indicating one or more requested context parameters. In an aspect, the discovery query is multicast or broadcast on the neighbor aware network. In some aspects, the discovery query may be generated by the processor 204 and transmitted by the transmitter 210 and/or the processor 204.

In an aspect, the discovery query further indicates a quality of service parameter for one or more of the requested context parameters. For example, in an aspect, the discovery query further indicates a requested quality of service (such as a sampling rate or duty cycle) of at least one of the requested context parameters. In some aspects, the discovery query further indicates an accuracy or fidelity requirement for a requested context parameter. For example, if the discovery query requests location information, the discovery query may also indicate that the location information must be accurate within a certain radius, for example five feet or one meter.

In some aspects, the discovery query further indicates a maximum allowed cost of one or more of the requested context parameters. In an aspect, the maximum allowed cost may be represented as a variety of different units of currency. In some aspects, the cost may be represented as a monetary currency, such as United States dollars or the European Union Euro. In some aspects, the currency may be represented as an amount of space on a user interface of a context consuming device that must be made accessible for display by other entities in exchange for the requested services or contexts. For example, in some aspects, the display of advertising on a user interface of a context consuming device may be exchanged for one or more contexts or services. In another aspect, the currency units may be an amount of other contexts requested by the context providing device. In these aspects, an exchange of context information can satisfy the cost parameters of the requested service. For example, the service exchange currency may specify a type of context, or a quality of service parameter such as a sampling rate or duty cycle that may be necessary in exchange for a requested context or service.

In some aspects, the requested context parameters represent local context information, in that the context parameters relate to environmental conditions within an area that is a threshold distance from at least one node in the neighbor aware network. Local context information may also include information collected from "soft" sensors as described above. In some aspects, the discovery query further indicates a keyword associated with a requested context parameter.

In an aspect, the maximum allowed cost may be represented as a variety of different units of currency. In some aspects, the cost may be represented as a monetary currency, such as United States dollars or the European Union Euro. In some aspects, the currency may be represented as an amount of space on a user interface of a context consuming device that must be made accessible for display by other entities in exchange for the requested services or contexts. For example, in some aspects, the display of advertising on a user interface of a context consuming device may be exchanged for one or more contexts or services. In another aspect, the currency units may be an amount of other contexts requested by the context providing device. In these aspects, an exchange of context information can satisfy the cost parameters of the requested service. For example, the service exchange currency may specify the type of context, or quality of service (such as a sampling rate or duty cycle) that may be necessary in exchange for a requested context or service. In some aspects, the quality of service parameters may indicate an availability time for one or more of the requested context parameters. For example, the response may indicate that a context parameter can be made available after an indicated elapsed time. In some aspects, the availability time may be indicated relative to a reference clock, for example, a clock used to synchronize availability windows on the neighbor aware network.

In block 777, the context consuming device receives a response to the discovery query, the response indicating one or more of the requested context parameters that may be provided, and one or more costs associated with providing the requested context parameters. In some aspects, reception of the response may be performed by the receiver 212 and/or the processor 204. Decoding of the response may be performed by the processor 204 in some aspects.

In various aspects, a cost associated with providing a requested context parameter may be represented in the response by a variety of different units of currency. In some aspects, the cost may be represented as a monetary currency, such as United States dollars or the European Union Euro. In some aspects, the currency may be represented as an amount of space on a user interface of a context consuming device that must be made accessible for display by other entities in exchange for the requested services or contexts. For example, in some aspects, the display of advertising on a user interface of a context consuming device may be exchanged for one or more contexts or services. In another aspect, the currency units may be an amount of other contexts requested by the context providing device. In these aspects, an exchange of context information can satisfy the cost parameters of the requested service. For example, the service exchange currency may specify the type of context, or quality of service (such as a sampling rate or duty cycle) that may be necessary in exchange for a requested context or service.

In an aspect, the response further indicates one or more values of the requested context parameters. In an aspect, the response further indicates a quality of service (for example, a sampling rate or duty cycle) of a context parameter that can be provided by the transmitter of the response. In an aspect, the transmitter of the response is a context providing device. In some aspects, the response further indicates information for establishing a secure communication channel between the context providing device and the context consuming device. For example, the response may include a public key to use when communicating with the context providing device. The response may also include in some aspects information relating to a group key sharing scheme that may be used to secure a channel of communication between the context consuming device and context providing device. In some aspects, the response further indicates a context parameter available from the context providing device that was not included in the requested context parameters. For example, in some aspects, some devices may offer unsolicited music, video, or local search services to other devices on the neighbor aware network.

Figure 8:
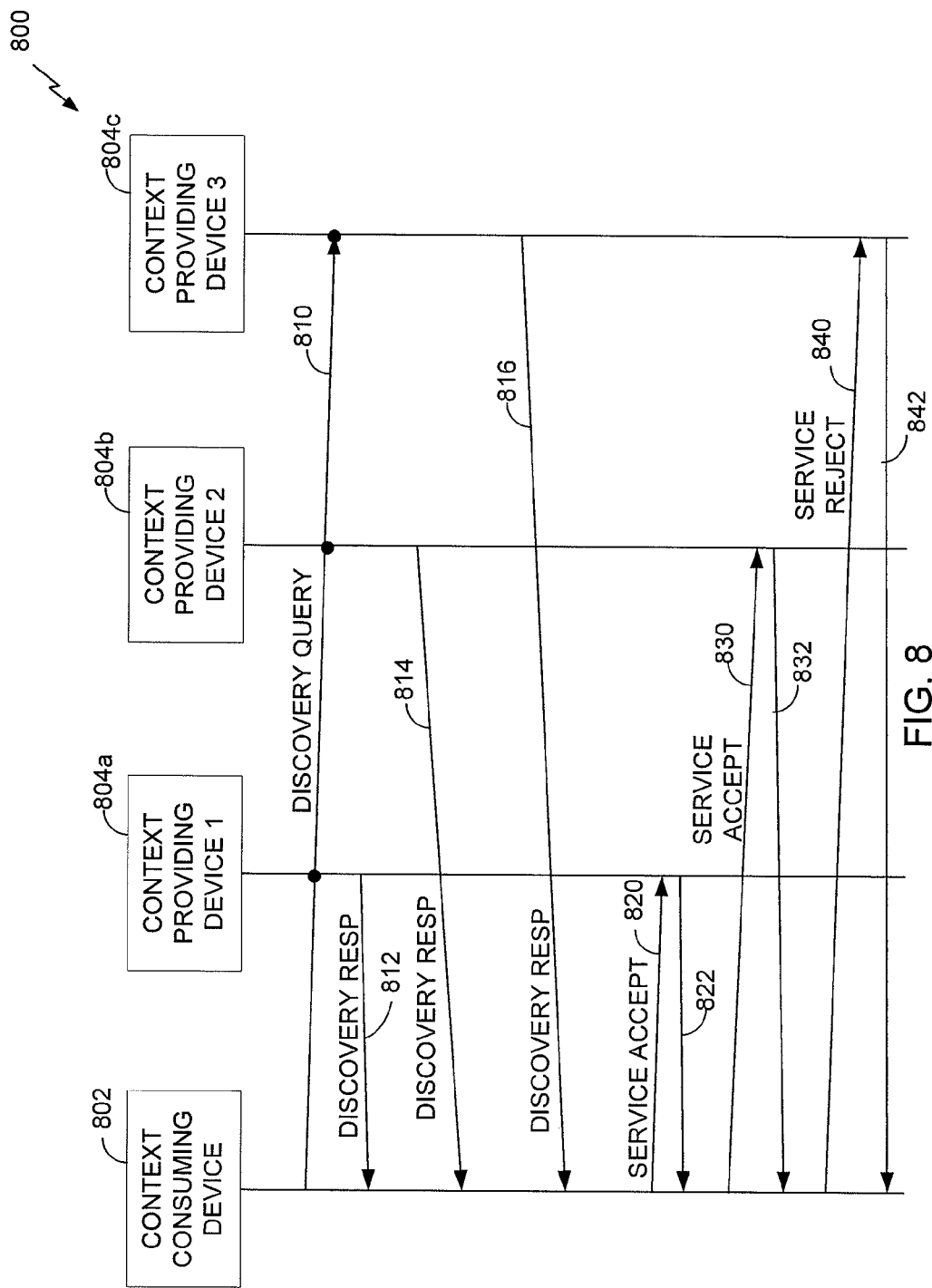
FIG. 8 is a sequence diagram showing one example of a discovery query and response message exchange on a neighbor aware network.

FIG. 8 is a sequence diagram showing one example of a discovery query and response message exchange on a neighbor aware network. The exchange of messages shown in FIG. 8 enable a context consuming device to establish agreements with context providing devices that have offered to provide context information or services to the context consuming device.

The sequence diagram shows four devices, including a context consuming device 802, and three context providing devices 804*a-c*. As discussed above with respect to FIG. 4, the context consuming device 802 may transmit a discovery query 810 on the neighbor aware network. The discovery query message 810 may be multicast or broadcast such that it is received by context providing devices 804*a-c*. The discovery query message 810 identifies one or more services or contexts requested by the context consuming device 802. For example, the context consuming device 802 may request local context information such as ambient lighting, ambient atmospheric pressure, ambient temperature, location information, or other context information such as that collected from one or more hardware or "soft" sensors as described above. In response to receiving the discovery query message 810, context providing device 804*a* transmits a discovery response message 812 to the context consuming device 802. The discovery response message may identify context parameters requested by the discovery query message 810 that can be provided by context providing device 804*a*. The discovery response message 812 may also include one or more services or contexts that can be provided to context consuming device 802 that were not requested by the context consuming device 802 when it transmitted the discovery query 810. Note that although FIG. 8 shows the discovery response message being transmitted from context providing device 1 804*a* to context consuming device 802, the discovery response message 812 may be received by other context providing devices, such as devices 804*b-c*. For example, at least one of context providing devices 804*b-c* may employ networking "sniffing" technology to receive network messages that are not addressed to them, but are receivable from network 800, for example, if a destination MAC address is ignored or otherwise bypassed as part of a message receiving process.

In response to receiving the discovery query message 810, context providing device 2 804*b* also transmits a discovery response message 814 to the context consuming device 802. Note again that although discovery response message 814 may use unicast addressing and be addressed only to context consuming device 802, at least context providing devices 1 and 2 (804*a* and 804*c*) may also receive the discovery response message 814, again, as one example via network sniffing technology. In some other aspects, the discovery response message 814 may be multicast or broadcast on the network 800. The discovery response message 814 also indicates context parameters or services that may be provided to context consuming device 802. In some aspects, the discovery response 814 may also indicate one or more services or contexts that can be provided to context consuming device 802 that were not indicated or requested in the discovery query message 810.

In response to receiving the discovery query message 810, context providing device 3 804*c* also transmits discovery response message 816 to context consuming device 802, the response indicating one or more context parameters that can be provided to the context consuming device 802.

Note that when a context providing device offers a service to a context consuming device, an expiration time for the offer of a service or context may be included in the discovery response. During the time of the offer of a service or context, the context providing device may reserve the offered service or context data for the context requesting device, and may not offer the service or context to other context providing devices if they so request during the time of the offer. This may be the case in some aspects if providing the service or context consumes a finite or limited resource within the context providing device, such as processing power, battery life, or other hardware or software resources. If no acceptance or other message is received from the context consuming device before the expiration time of the offer, the context providing device may stop reserving the requested service or context, and offer it to another context consuming device if requested.

During or after reception of the three discovery responses 812, 814, and 816, context consuming device 802 may determine which of the context parameters requested in discovery query 810 can be provided by context providing devices 804*a-c*. Some particular context parameters may only be offered by one of the context providing devices. Other context parameters may be offered by two or more of the context providing devices, while some other context parameters may be unavailable from the three context providing devices 804*a-c*. Based on the context parameters offered by the three context providing devices 804*a-c*, context consuming device 802 may determine from which of the context providing devices it will obtain one or more of the requested context parameters. Once this determination is made, the context consuming device may need to accept one or more of the context providing devices offers to provide context parameters.

This acceptance may be performed by a further message exchange with each of the context providing devices selected to provide context parameters. For example, context consuming device 802 may send a context acceptance message 820 to context providing device 1 804*a*, indicating a set of context parameters to be received from the context providing device 804*a*. Context providing device 1 804*a* may then confirm or reject that it will provide the set of context parameters indicated in the acceptance message 820 via an acceptance reply message 822. Similar exchanges may occur between context consuming device 802 and context providing devices 804*b-c*, shown as message exchanges 830-832, and 840-842.

Figure 9:
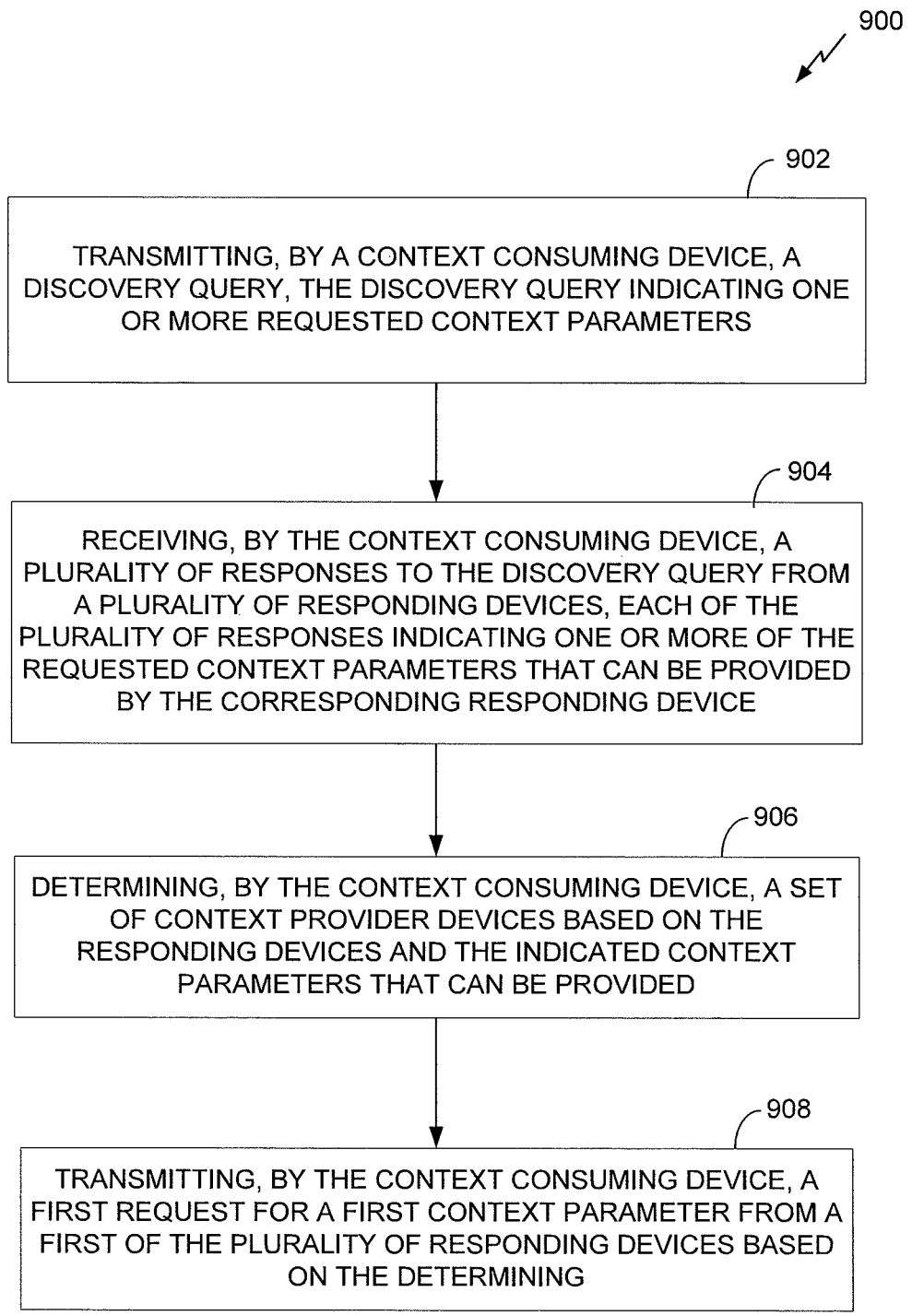
FIG. 9 is a flowchart showing one example of a method of sharing context information between wireless devices on a neighbor aware network.

FIG. 9 is a flowchart showing one example of a method of sharing context information between wireless devices on a neighbor aware network. In an aspect, process 900 is performed by the wireless device 202. In an aspect, process 900 may enable a context consuming device to establish agreements with context providing devices that have offered to provide context information or services to the context consuming device. In some aspects, process 900 may include one or more of the functions of process 770, described above with respect to FIG. 7.

In block 902, a context consuming device transmits a discovery query. The discovery query may be generated by the processor 204 and transmitted by the transmitter 210 and/or the processor 204 in some aspects. The discovery query is generated to indicate one or more requested context parameters. In an aspect, the context information is local context information. In an aspect, the context information includes one or more of audio, location, identity, ambient lighting, ambient atmospheric pressure, or ambient temperature, or other information from hardware or "soft" sensors as described above. In an aspect, the discovery query further indicates a requested quality of service (such as a sampling rate or duty cycle) of at least one of the requested context parameters. In an aspect, the discovery query further indicates a keyword associated with a requested context parameter.

In block 904, the context consuming device receives a plurality of responses to the discovery query from a plurality of responding devices, each of the plurality of responses indicating one or more of the requested context parameters that can be provided by the corresponding responding device. In some aspects, reception of the plurality of responses may be performed by the receiver 212 and/or the processor 204. The plurality of responses may be decoded by the processor 204 in some aspects. In some aspects, at least one of the plurality of responses further indicates one or more costs associated with providing the requested context parameters. For example, in some aspects, at least one of the received responses may operate as described above with respect to the response transmitted in block 710. In some aspects, at least one of the plurality of responses further indicates one or more values of the requested context parameters. In some aspects, at least one of the plurality of responses further indicates a quality of service (such as a sampling rate or duty cycle) of a context parameter that can be provided by the responding device. In an aspect, the response further indicates information for establishing a secure communication channel between the context providing device and the context consuming device. For example, at least one of the responses may indicate a public key that may be used to secure a communication channel between the context consuming device and the responding device. In some aspects, the response further indicates a context parameter available from the context providing device that was not included in the requested context parameters. While the description above of block 904 indicates a plurality of responses are received, in some aspects, only one response is received. In some other aspects, no responses may be received in block 904.

In block 906, the context consuming device determines a set of context provider devices based on the responding devices and the indicated context parameters that can be provided. In some aspects, the determining may be performed by the processor 204. The context consuming device may determine a set of context parameters that may be provided by at least one of the devices. For those context parameters that can only be provided by one of the responding devices, the context consuming device may determine that those context parameters will be obtained from the one responding device that offered to provide the parameter. For context parameters that can be provided by more than one responding device, the context consuming device may determine which responding device a particular context parameter will be obtained from based on one or more of a cost associated with the context parameter indicated by each of the devices, a reputation of the responding device or a reputation associated with an address of the responding device, and/or a quality of service (such as a sampling rate or duty cycle) associated with each of the responses. In some aspects, the context consuming device may determine that a single context parameter will be obtained from more than one context providing device. This may be done, for example, to ensure redundancy in obtaining the context parameter or to verify the accuracy of the context parameter when it is provided by each of the devices.

In block 908, the context consuming device transmits a first request for a first context parameter from a first of the plurality of responding devices based on the determining. In some aspects, the transmission of the first request may be performed by the transmitter 210 and/or the processor 204. In some aspects, the first request of block 908 may act as an acceptance of a responding device's offer to provide one or more context parameters to the context consuming device in block 906. As a result of the request of block 908, the receiving device may begin to periodically, in some aspects based on agreed upon quality of service parameters (such as duty cycles or sampling rates), transmit context information to the context consuming device. In some aspects, more than one requested context parameter may be accepted or requested by the transmitted request. In some aspects, the context consuming device transmits a second request to a second of the context providing or responding devices based on the determining. This second request may request different context parameters than those requested in the first request. Alternatively in some aspects, at least some of the context parameters requested in the second request may be common to the first request.

Figure 10:
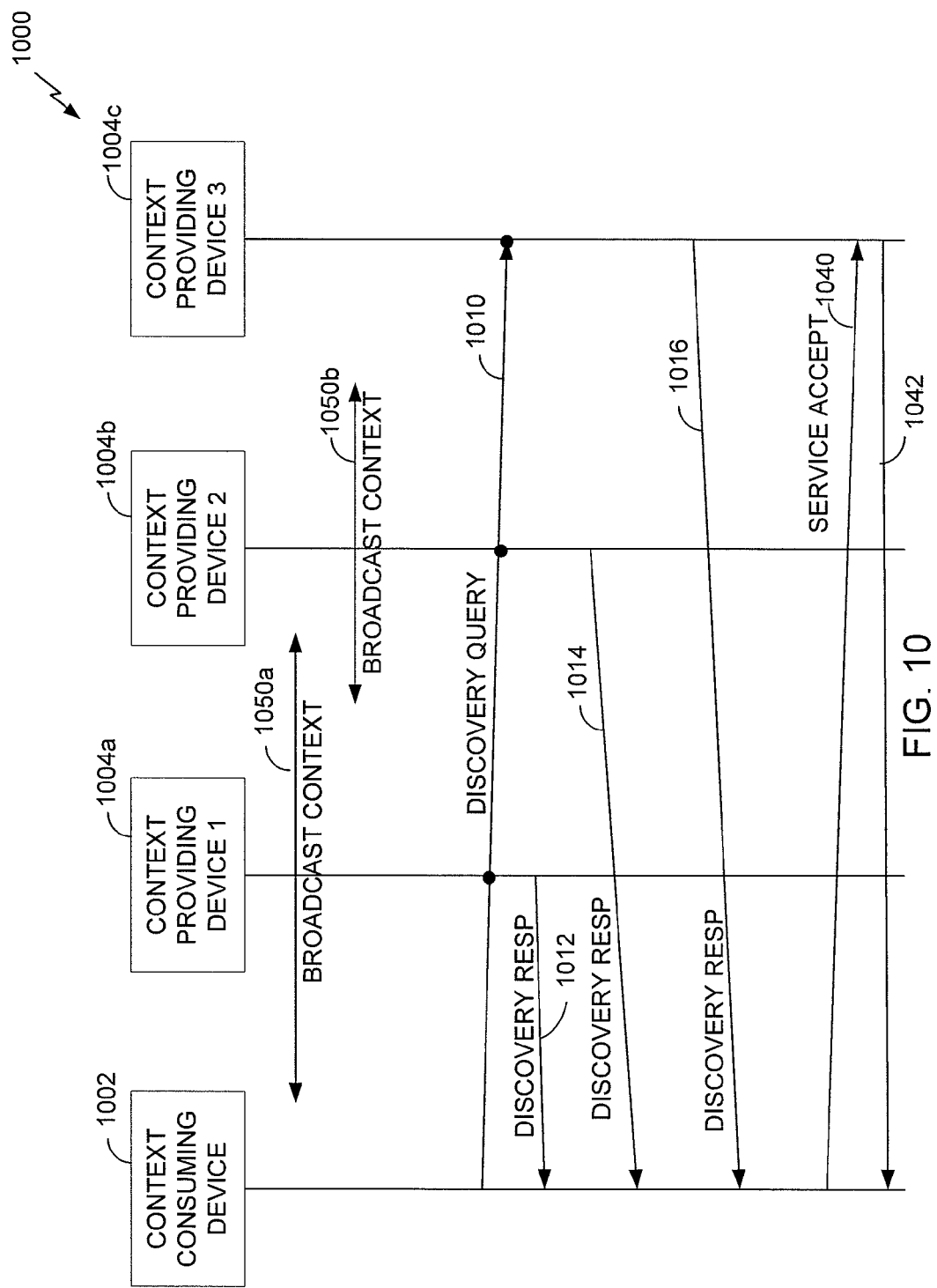
FIG. 10 is a sequence diagram showing one example of a discovery query and response message exchange on a neighbor aware network.

FIG. 10 is a sequence diagram showing one example of the sharing of context information on a neighbor aware network 1000. The sharing of context shown in FIG. 10 may enable a context consuming device to obtain context information utilized by one or more applications executing on the device.

FIG. 10 illustrates a context consuming device 1002 and three context providing devices 1004a-c. Each of context providing devices 1004a-b are multicasting or broadcasting context information via messages 1050a-b. The messages 1050a-b may be received by one or more devices on the NAN 1000. In an aspect, the context information indicated by messages 1050a-b may be included in some aspects, in a context information element (IE). In some aspects, the messages 1050a-b may further indicate a quality of service of the broadcasted context information. For example, if location information is being broadcast, the broadcast message may also indicate the accuracy of the location information.

One or more applications executing on context consuming device 1002 (not shown) may have a need for one or more types of context information. The applications may also need context information that meets certain quality of service parameters, such as a minimum sampling rate, duty cycle, or accuracy level.

Context consuming device 1002 may receive at least a portion of the needed context information from the broadcast messages 1050a-b. In some aspects, a second portion of the context information needed by one or more applications executing on context consuming device 1002 may not be satisfied by the context information indicated by the messages 1050a-b.

As shown in FIG. 10, context consuming device 1002 may then transmit a discovery query 1010 over the NAN 1000. The discovery query message 1010 may share one or more of the attributes of discovery query messages 410 or 810 discussed above. In some aspects, the discovery query 1010 may be transmitted using a unicast address, for example, transmitted only to context providing device 1004c. In some aspects, the discovery query message may be broadcast or multicast as shown in FIG. 10.

After receiving the discovery query, the three context providing devices 1004a-c respond with discovery response messages 1012, 1014, and 1016. The discovery response messages may share one or more of the attributes discussed above with respect to messages 812, 814, or 816 of FIG. 8. In the illustrated aspect, context consuming device 1002 accepts a service offered by context providing device 1004c and transmits a service accept message 1040. The service accept message may share one or more of the attributes of service accept or reject messages 820, 830, or 840 discussed above with respect to FIG. 8. Context providing device 1004 responds to the service accept message 1040 with a response message 1042.

Figure 11:
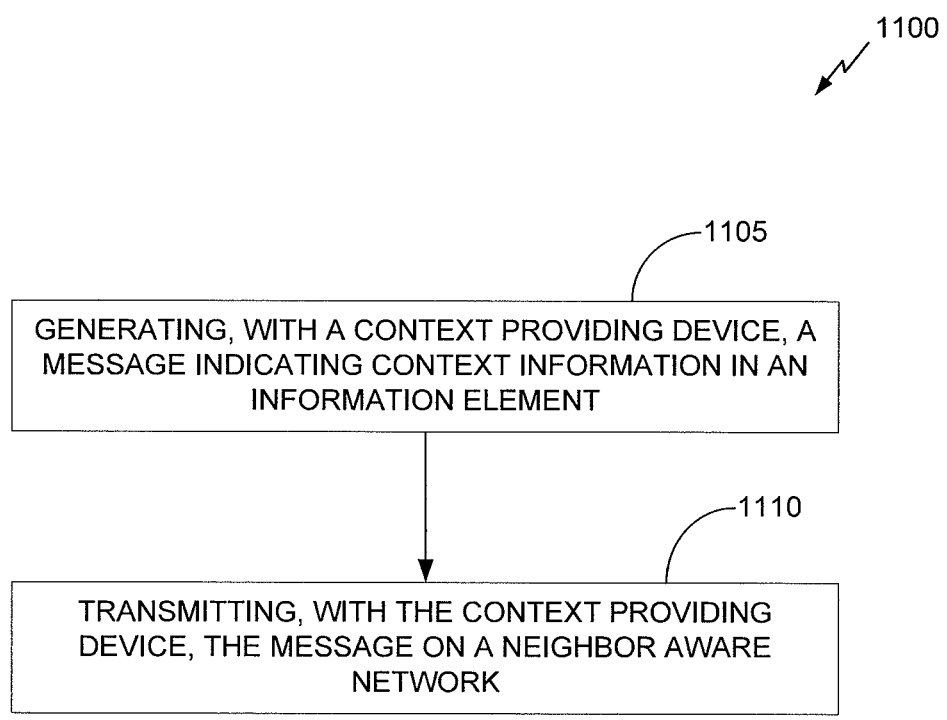
FIG. 11 is a flowchart showing one example of a method of sharing context information between wireless devices on a neighbor aware network.

FIG. 11 is a flowchart showing one example of a method of sharing context information between wireless devices on a neighbor aware network. In some aspects, the neighbor aware network is also an 802.11 network. In an aspect, process 1100 is performed by the wireless device 202. In an aspect, process 1100 may enable a context providing device to share its context information with one or more nodes or devices on the neighbor aware network. In some aspects, process 1100 may include one or more of the functions of processes 500 or 700, described above with respect to FIGS. 5 and 7 respectively.

In block 1102, a message is generated by a context providing device. In some aspects, the generation of the message is performed by the processor 204. The message indicates context information in an information element. In an aspect, the information element is formatted as an 802.11 information element. In an aspect, the message may include one or more context parameters. In an aspect, the context information is local context information, such as audio, location, identity, ambient lighting, ambient atmospheric pressure, or ambient temperature information, or other information from hardware or "soft" sensors as described above.

In some aspects, the message further indicates quality of service information for one or more of the indicated context information parameters. For example, the message may indicate a sampling rate or accuracy level of an indicated context parameter. In some aspects, the message is a beacon, probe response, or short frame for an 802.11 network.

In block 1110, the message is transmitted on a neighbor aware network. In some aspects, the message is broadcast. In some aspects the message is multicast. In some aspects, the context providing device is an access point. In some aspects, the transmitter 210 and/or the processor 204 transmits the message in block 1110.

Figure 12:
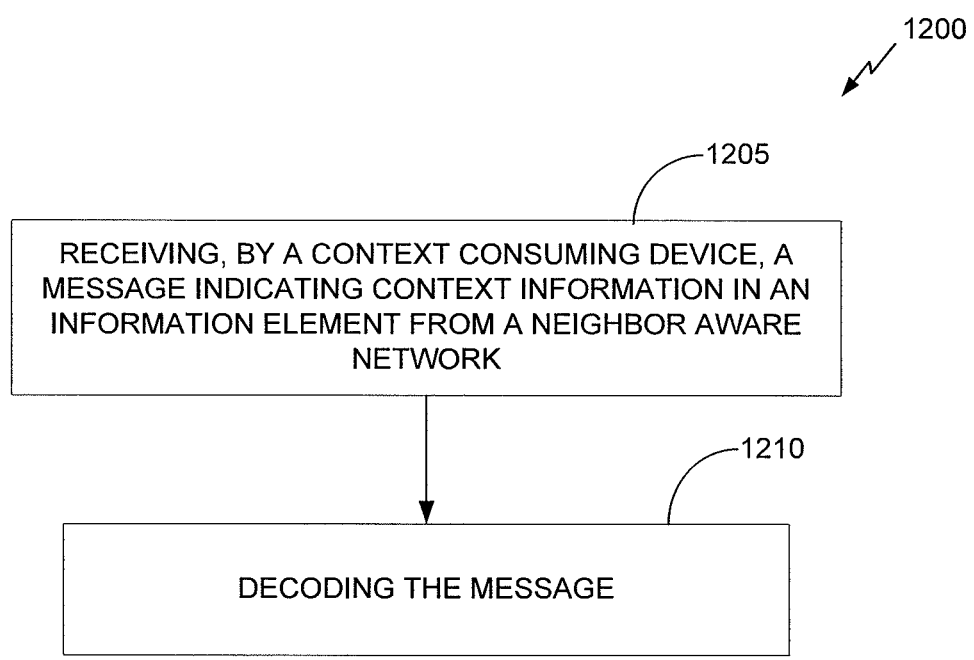
FIG. 12 is a flowchart showing one example of a method of sharing context information between wireless devices on a neighbor aware network.

FIG. 12 is a flowchart showing one example of a method of sharing context information between wireless devices on a neighbor aware network. In some aspects, the neighbor aware network is also an 802.11 network. In an aspect, process 1200 is performed by the wireless device 202. In an aspect, process 1200 may enable a context consuming device to receive context information from one or more nodes on the neighbor aware network. In some aspects, process 1200 may include one or more of the functions of processes 770 or 900, described above with respect to FIGS. 7 and 9 respectively.

In block 1202, a message is received by a context consuming device. In some aspects, the reception of the message in block 1202 is performed by the receiver 212 and/or the processor 204. In an aspect, a context consuming device may be any device. In some aspects, the message indicates context information in an information element. In an aspect, the information element is formatted as an 802.11 information element. In an aspect, the information element may include one or more context parameters. In an aspect, the context information is local context information, such as audio, location, identity, ambient lighting, ambient atmospheric pressure, or ambient temperature information, or information from other hardware or "soft" sensors as described above. In some aspects, the message and/or information element further indicates quality of service information for one or more of the indicated context information parameters. For example, the message and/or information element may indicate a sampling rate or accuracy level of an indicated context parameter. In some aspects, the message is a beacon, probe response, or short frame for an 802.11 network. In some aspects, the message is received on a broadcast or multicast address.

In block 1210, the message is decoded. In an aspect, decoding the message may include determining whether any application executing on the context consuming device can use or is requesting context information indicated or included in the message. The decoding of the received message may be performed by the processor 204 in some aspects.

Figure 13:
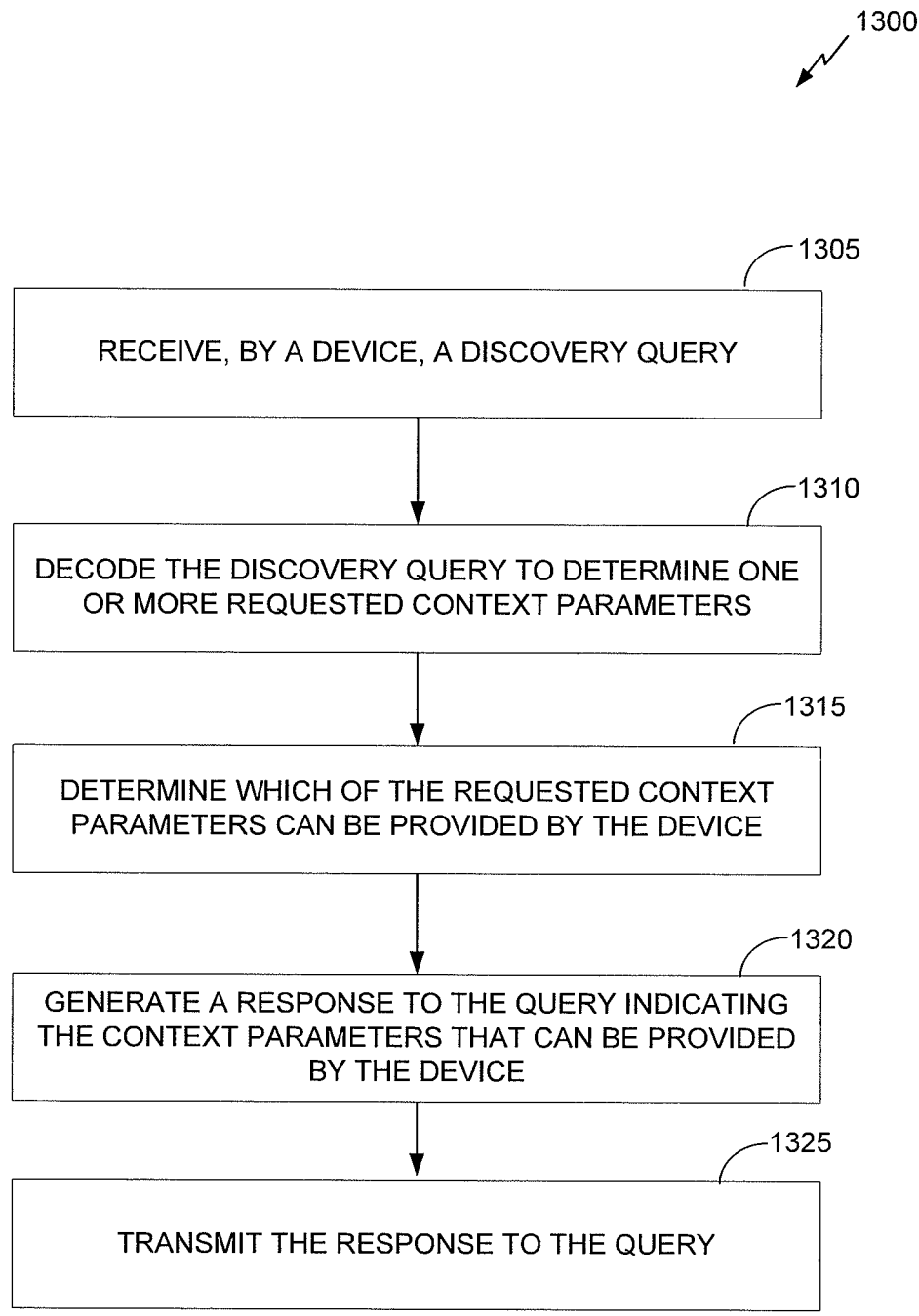
FIG. 13 is a flowchart showing one example of a method of sharing context information between wireless devices on a neighbor aware network.

FIG. 13 is a flowchart showing one example of a method of sharing context information between wireless devices on a neighbor aware network. In some aspects, the neighbor aware network is also an 802.11 network. In an aspect, process 1300 is performed by the wireless device 202. In an aspect, process 1300 may enable a context producing device to provide context information to a context consuming device on the neighbor aware network. In some aspects, process 1300 may include one or more of the functions of processes 500, 700, 770 or 1100, described above with respect to FIGS. 5, 6, 7 and 11 respectively.

In block 1305, a discovery query is received by a device. In some aspects, the reception of the discovery query is performed by the receiver 212 and/or the processor 204. In some aspects, the discovery query is an 802.11 wireless message. In block 1310, the discovery query is decoded to determine one or more requested context parameters. In some aspects, the decoding of the discovery query is performed by the processor 204.

In an aspect, the context parameters are local context parameters, in that the context parameters relate to a location of the neighbor aware network. Local context parameters may include one or more of audio, location, identity, ambient lighting, ambient atmospheric pressure, ambient temperature, or other information from hardware or "soft" sensors as described above. In some aspects, the received discovery query may also indicate a requested quality of service (such as a sampling rate or duty cycle) for one or more of the requested context parameters. For example, the requesting device may request to obtain ambient temperature context information once per minute in some aspects.

In some aspects, the discovery query may be decoded to determine a minimum accuracy or fidelity of a requested context parameter. For example, if a requested context parameter is location information, the discovery query may indicate that the location information must be accurate within a certain radius. For example, the location information provided should be accurate within five feet or one meter. In an aspect, process 1300 includes decoding the discovery query to determine a keyword associated with a requested context parameter. In some aspects, process 1300 includes decoding the discovery query to determine one or more quality of service parameters associated with one or more of the requested context parameters. For example, a device transmitting the discovery query may require a time service or a geo-location service to be within a certain accuracy. The quality of service parameters may convey the accuracy requirements to a receiver in some aspects.

In block 1315, requested context parameters that can be provided by the device are determined. In an aspect, the requested context parameters that can be provided by the device are determined based on the device's context capabilities. In some aspects, the determination is performed by the processor 204.

Device capabilities may include a variety of aspects of the device. For example, whether a device includes particular hardware to sensor one or more context parameters may be indicated by the device's capabilities. Some devices may include one or more of a temperature sensor, ambient light sensor, GPS receiver, pressure sensor, etc. To the extent a device is unable to sense a context parameter, the context parameter will not be reflected in the device's capabilities and will not be included in a set of context parameters that can be provided.

In some aspects, a set of context parameters a device can provide to other devices may be based on a power constraint of the device. For example, some services or context information may only be made available to other devices when the device is operating on power provided via a wall outlet or other reliable source of power. In some aspects, when the device is relying solely on battery power, some services or context information may not be offered to other devices on the neighbor aware network. For example, because obtaining GPS location information can consume substantial amounts of power in some aspects, some devices may conditionally offer to provide location data to other devices on a neighbor aware network only if they are not operating on battery power alone.

In some aspects of process 1300, the device receives one or more responses to the discovery query. These one or more responses may be received from a plurality of other wireless devices on the neighbor aware network. One or more of the responses may indicate a transmitter of the response can provide an indicated one or more of the requested context parameters. In some aspects, the response also includes a quality of service (such as a sampling rate or duty cycle) that can be provided for one or more of the offered context parameters. In some aspects, the discovery response may indicate a minimum accuracy or fidelity of an offered context parameter. For example, if a context parameter that can be provided is location information, the response to the discovery query may indicate that the location information that can be provided is accurate within a certain radius. For example, the location information provided will be accurate within five feet or one meter.

In an aspect, the device determines a set of outstanding context parameters based on the requested context parameters and the context parameters indicated in the responses. In some aspects, the outstanding context parameters are determined by subtracting the context parameters indicated in the responses from the requested context parameters.

In block 1320, a response to the discovery query is generated. The response indicates the context parameters that can be provided by the device. In some aspects, the response is generated to indicate context parameters that were not included in the requested context parameters. In some aspects, the generation of the response is performed by the processor 204.

In some aspects, the response to the query is generated to indicate one or more costs associated with the context parameters that can be provided. In some aspects, one or more of the costs represent a quantity of advertising that must be displayed on a user interface of the context consuming device in exchange for an associated context parameter. In some aspects, one or more of the costs represent an amount of monetary currency to be provided in exchange for an associated context parameter. In some aspects, the cost may be represented as a monetary currency, such as United States dollars or the European Union Euro.

In some aspects, the currency may be represented as an amount of space on a user interface of a context consuming device that must be made accessible for display by other entities in exchange for the requested services or contexts. For example, in some aspects, the display of advertising on a user interface of a context consuming device may be exchanged for one or more contexts or services.

In another aspect, the currency units may be an amount of other contexts requested by the context providing device. In these aspects, an exchange of context information can satisfy the cost parameters of the requested service. For example, the service exchange currency may specify the type of context, quality of service (such as a sampling rate or duty cycle) that may be necessary in exchange for a requested context or service.

In some aspects, one or more of the costs represent an electronic service to be provided in exchange for an associated context parameter. In some aspects, the electronic service provides a context parameter.

In some aspects, the method includes generating the response to the query to indicate a quality of service of a context parameter that can be provided. For example, the response may indicate a sampling rate, duty cycle, or an availability time for one or more of the requested context parameters.

In an aspect, the response is generated to indicate information for establishing a secure communication channel between the transmitter of the response and a discovery query transmitter. In some aspects, the response is generated to indicate the one or more requested context parameters that can be provided by the receiving device in an information element of the response. For example, an 802.11 information element structure may be used to communicate this information.

In block 1325, the response to the query is transmitted on the wireless network. In some aspects, transmission of the response may be performed by the transmitter 210 and/or processor 204. In some aspects, the response is transmitted to a device indicated in the discovery query message received in block 1305. For example, the discovery query message may indicate a transmitting device, and the response is transmitted to the device transmitting the query.

As described above, a wireless device, such as wireless device 202, may be configured to provide services within a wireless communication system, such as the wireless communication system 100 or 160. For example, the wireless device 202, such as STA 106, may include hardware (e.g., a sensor, a global positioning system (GPS), etc.) that is used to capture or calculate data (e.g., sensor measurements, location coordinates, etc.). An application running on STA 106 may then use the captured or calculated data to perform an operation. In some cases, the captured or calculated data may be useful to other STAs 106 in the wireless communication system 100. The other STAs 106 could include similar hardware so as to capture or calculate similar data. Alternatively, the STA 106 could provide these services (e.g., the captured or calculated data) to the other STAs 106. The STA 106 may inform the other STAs 106 of the services that the STA 106 provides by advertising this information over the wireless communication system 100. Likewise, the other STAs 106 could also advertise the services that they provide over the wireless communication system 100. In this way, STAs 106 in the wireless communication system 100 may be aware of services available in the wireless communication system 100 and avoid performing duplicative operations. Such a wireless communication system may be referred to as a neighbor aware network (NAN).

However, while STAs 106 in the wireless communication system 100 may benefit if one or more STAs 106 advertise the services that they each respectively provide, other problems may occur. For example, the advertisement of services generally occurs by transmitting a periodic message that includes the service information. The communication circuitry of STA 106, such as transceiver 214, may remain active in order to transmit the periodic messages and/or to receive requests for services from other STAs 106. Accordingly, the STA 106 may consume an increased amount of power. For a STA 106 that is connected to a source of continuously available power (e.g., a power outlet, an energy harvesting device, etc.), the increased power usage may not be a concern. On the other hand, for those STAs 106 that are battery-powered, the increased power usage may be problematic.

In addition, the advertising of services may lead to an increase in the number of packets transmitted over the wireless communication system 100. The increase in the number of packets transmitted over the wireless communication system 100 may lead to an increase in the number of packet collisions that occur. The collisions may cause the loss of data and/or may require STAs 106 to resend packets, further increasing the power consumption of the STAs 106.

Likewise, the air link occupancy of the wireless communication network 100 may be increased. For example, each advertisement message transmitted by a STA 106 includes a physical (PHY) layer, a medium access control (MAC) layer, and the data (e.g., information regarding the service(s) provided by the respective STA 106). Thus, the air link occupancy may be increased due to the increased overhead (e.g., the PHY and MAC layers).

In order to avoid or minimize the problems discussed above, a proxy STA may be introduced into the wireless communication system 100. A proxy STA may be a STA 106 in the wireless communication system 100 that offers to advertise services on behalf of one or more other STAs 106. For example, the proxy STA may be a STA 106 connected to a source of continuously available power and may advertise services on behalf of another STA 106 that is battery-powered. A proxy STA may allow other STAs 106 to conserve power by not having to advertise their services and/or remaining active for long periods of time. Since the proxy STA may advertise services for a plurality of STAs 106, fewer collisions may occur due to the reduced number of packets being transmitted over the wireless communication system 100. Similarly, the air link occupancy may be reduced due to a reduced overhead (e.g., one message that includes a PHY layer, a MAC layer, and data for three STAs is transmitted rather than three separate messages that each include a PHY layer, a MAC layer, and data).

In some embodiments, the privacy concerns of having one device (e.g., a proxy STA) advertise services on behalf of another device are minimized. If all of the devices within the wireless communication system 100 are associated with the same user, then the fact that a proxy STA may collect data from another STA is not problematic. For example, if two devices are associated with the same user, the two devices may be located in close proximity to each other. While location information may otherwise be considered private data, no privacy concerns would be raised if the first device advertises location services on behalf of the second device since both are in close proximity to each other (e.g., the first device already knows the location of the second device since they are in close proximity to each other). The election of a proxy STA, the use of more than one proxy STA, the detection of a departure of a STA, and the information provided to proxy STAs is described in greater detail below with respect to FIGS. 3-9.

Figure 14:
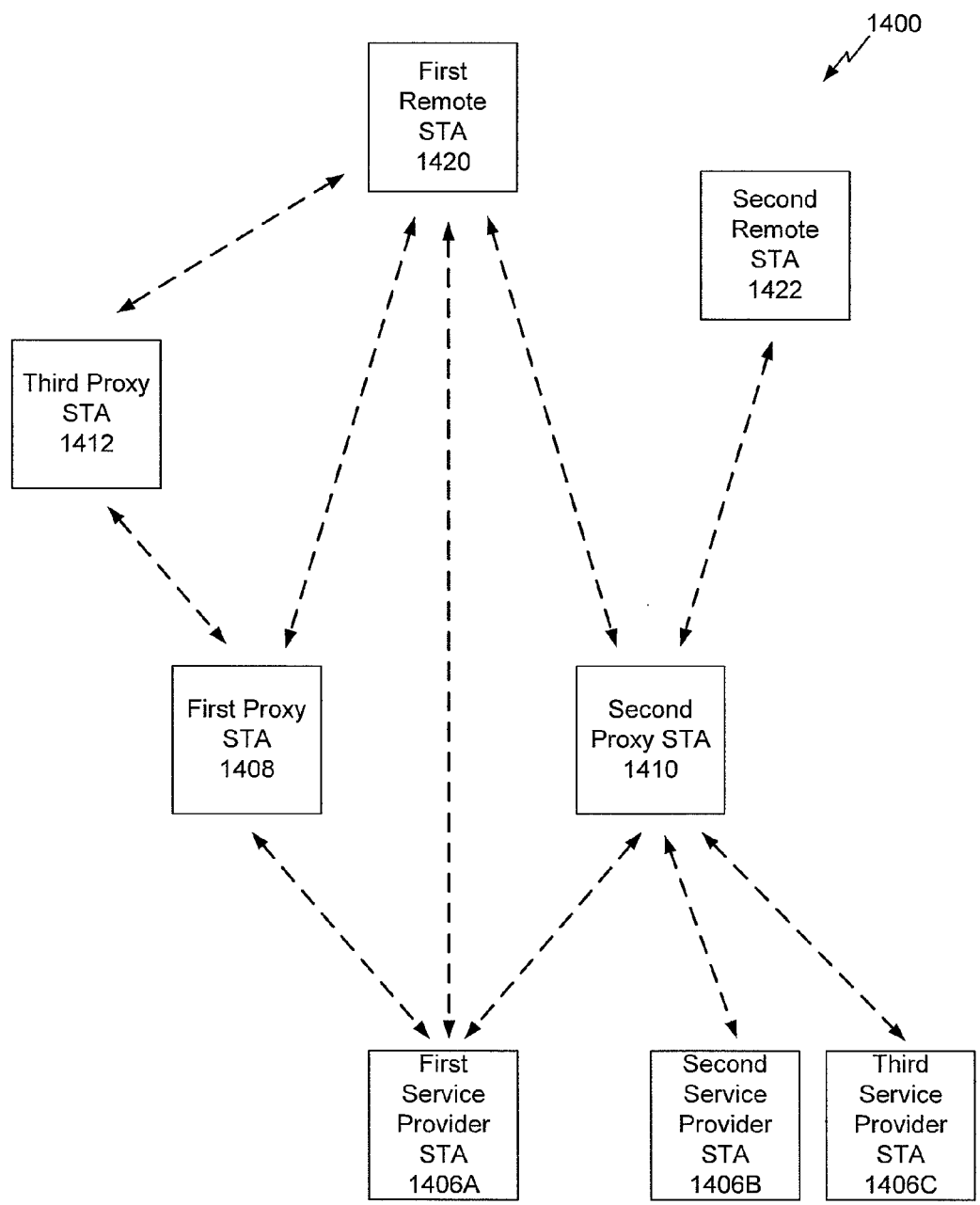
FIG. 14 illustrates a wireless communication system in which a proxy station may operate.

FIG. 14 illustrates a wireless communication system 1400 in which a proxy STA may operate. As illustrated in FIG. 14, wireless communication system 1400 comprises a first service provider STA 1406A, a second service provider STA 1406B, a third service provider STA 1406C, a first proxy STA 1408, a second proxy STA 1410, a third proxy STA 1412, a first remote STA 1420, and/or a second remote STA 1422. As used herein, a "service provider STA" refers to STA that allows another device to advertise the services that the STA provides on behalf of the STA. The service provider STA provides the services that are advertised by another device. Furthermore, as used herein, a "proxy STA" refers to a STA that advertises the availability of services or the services themselves on behalf of another STA. Services may refer to data captured, calculated, or otherwise determined by a STA (e.g., sensor measurements, like temperature or pressure readings, GPS coordinates, etc.). The proxy STA may also advertise the availability of services or the services themselves that are offered by the proxy STA. Moreover, as used herein, a "remote STA" refers to a STA that uses the services provided by another STA (e.g., that uses the services provided by a service provider STA and/or that uses the services provided by a proxy STA). Although FIG. 14 illustrates a number of STAs, those of skill in the art will recognize that more or fewer STAs may be associated with the wireless communication system 1400.

In an embodiment, a service provider STA may select one or more proxy STAs to advertise services on behalf of the service provider STA. For example, first service provider STA 1406A may select first proxy STA 1408, second proxy STA 1410, or both to advertise services on behalf of the first service provider STA 1406A. If just the first proxy STA 1408 is selected, the first proxy STA 1408 may advertise some or all of the services provided by the first service provider STA 1406A. Likewise, if just the second proxy STA 1410 is selected, the second proxy STA 1410 may advertise some or all of the services provided by the first service provider STA 1406A. If both the first proxy STA 1408 and the second proxy STA 1410 are selected, each proxy STA 1408 and 1410 may advertise some or all of the services provided by the first service provider STA 1406A. The first proxy STA 1408 and the second proxy STA 1410 may advertise the same services, different services, or a combination of the same services and different services.

Similarly, a proxy STA may advertise services on behalf of one or more service provider STAs. For example, the second proxy STA 1410 may advertise services on behalf of the first service provider STA 1406A, the second service provider STA 1406B, and/or the third service provider STA 1406C. The advertisement message transmitted by the second proxy STA 1410, which is described in greater detail below, may include the service information for each service provider STA that the second proxy STA 1410 advertises on behalf of.

In some embodiments, a proxy STA may itself have one or more other proxy STAs advertise on its behalf. For example, the third proxy STA 1412 may be a proxy STA for the first proxy STA 1408. The third proxy STA 1412 may transmit a message advertising the services of the first proxy STA 1408 and any STA that the first proxy STA 1408 is a proxy STA for (e.g., the first service provider STA 1406A).

The advertisements transmitted by a proxy STA may be received by one or more remote STAs. For example, an advertisements may be a broadcasted message. The message broadcasted by the first proxy STA 1408, the second proxy STA 1410, and/or the third proxy STA 1412 may be received by the first remote STA 1420 and/or the second remote STA 1422. The first remote STA 1420 and/or the second remote STA 1422 may then use the information received in the advertisement (e.g., if the actual services are provided in the advertisement) or contact the appropriate service provider STA 1406A, 1406B, and/or 1406C to obtain the relevant information (e.g., if information regarding which service provider STA provides which services is provided in the advertisement).

Electing a Proxy STA

Any STA in the wireless communication system 1400 may serve as a service provider STA, a proxy STA, or a remote STA. A STA may function as a remote STA if, for example, the STA desires certain information to perform an operation. Whether a STA functions as a service provider STA or a proxy STA may depend on the capabilities of the STA or may be randomly chosen.

In an embodiment, a STA may be selected as a proxy STA via a proactive approach. For example, each STA in the wireless communication system 1400 may advertise a proxy preference number. A proxy preference number may indicate an interest of a STA in being a proxy STA. As an example, the proxy preference number may range from 0 to 255, with 0 indicating no interest and 255 indicating a high interest. As those of skill in the art will recognize, the proxy preference number may include any range of numbers. In some aspects, the proxy preference number may be a proxy capability indicator. In some of these aspects, a zero value for a proxy preference number may indicate the STA does not have a capability to be a proxy. A non-zero value may indicate in some aspects that the STA does have proxy capabilities.

The proxy preference number may be chosen based on a set of criteria. The criteria may include the capabilities of the STA (e.g., whether the STA is battery-powered or connected to a source of continuously available power, whether the STA provides services to other devices, whether the STA uses services provided by other devices, a period of time that the STA expects to be associated with the wireless communication system 1400, whether the STA experiences high or low levels of noise when communicating within the wireless communication system 1400, the transmission and/or reception strength of the transceiver of the STA, or the like), a proximity of the STA to one or more other STAs, an owner of the STA and/or one or more other STAs, a cost of proxy services if provided by the STA, the power required for information exchange, a time of availability of the proxy service if offered by the STA, and/or the like. The criteria may be considered as a whole in order to generate the proxy preference number. Alternatively, some or all of the criteria may each correspond to the generation of a separate proxy preference number. One of the proxy preference numbers may be selected (e.g., based on a criteria that is deemed more important than other criteria) or a proxy preference number for the STA may be generated based on a combination of the separate proxy preference numbers.

In some aspects, a STA takes on the role of advertising for a device that has a lower proxy preference number. For example, the first proxy STA 1408 may advertise on behalf of the first service provider STA 1406A because a proxy preference number of the first proxy STA 1408 may be higher than a proxy preference number of the first service provider STA 1406A. If a first STA already functions as a proxy STA, the first STA may give up its proxy status if a second STA that functions as a proxy STA advertises a higher proxy preference number than the proxy preference number of the first STA. The second STA may then serve as a proxy for the first STA.

The proxy preference number may not be static. For example, a STA may adjust its proxy preference number based on a change in power status of the STA (e.g., the STA is no longer connected to a source of continuously available power), on a number of STAs that the STA acts as a proxy on behalf of (e.g., the STA may not want to act as a proxy for any additional STAs), and/or on any other capabilities or changes thereof of the STA.

In some aspects, two STAs in the wireless communication system 1400 may have the same proxy preference number. The STA selected to be the proxy STA may be chosen at random. Alternatively, the STA selected to be the proxy STA may be based on a comparison of capabilities of each STA. For example, the STA selected to be the proxy STA may be the STA that has a longer expected battery life (or that is connected to a source of continuously available power).

Figure 15A:
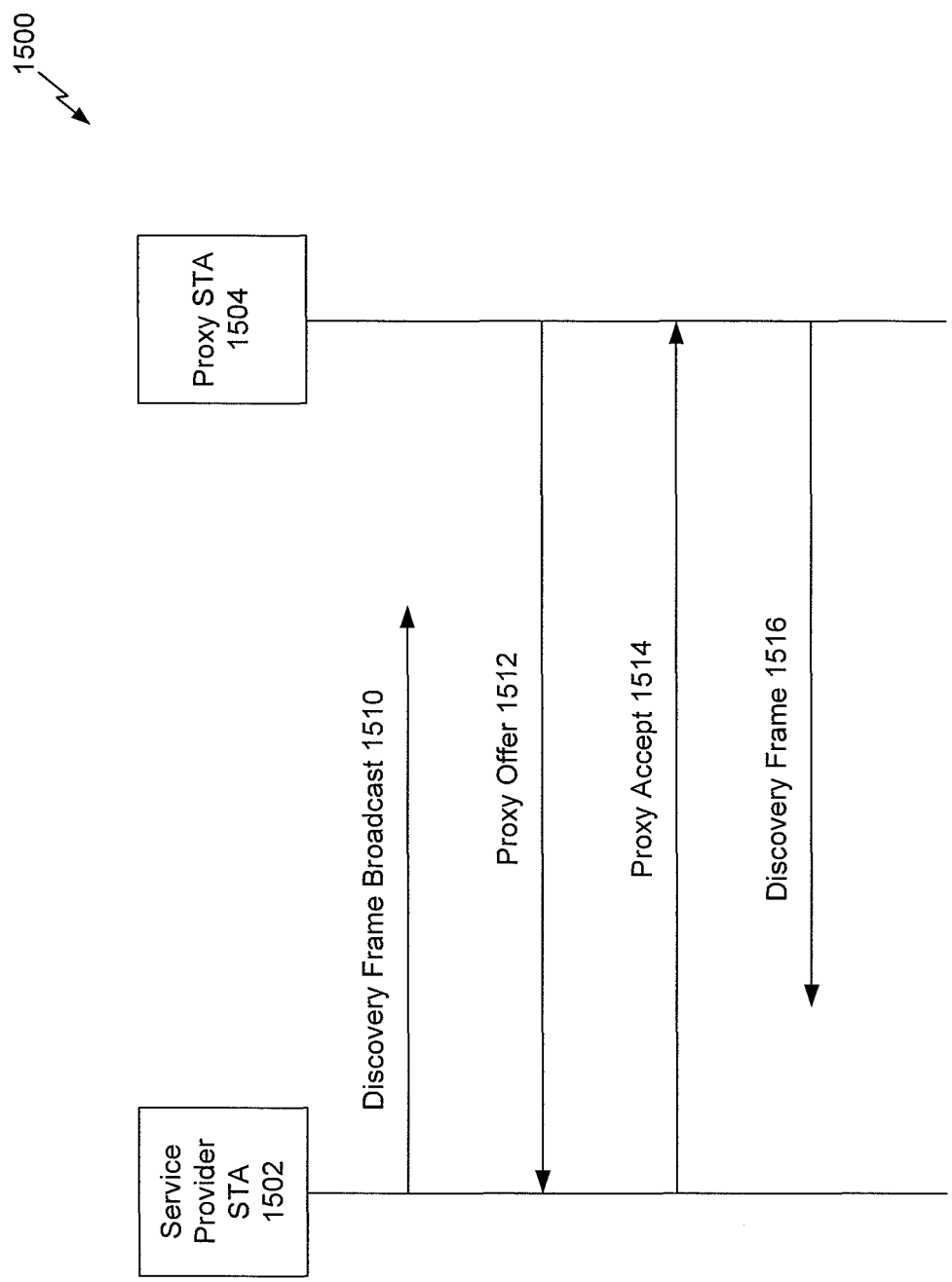
FIG. 15A illustrates a wireless communication system in which a proxy station is elected using an offer-based approach.

In another embodiment, a STA may be selected as a proxy STA via an offer-based approach. FIG. 15A illustrates a wireless communication system 1500 in which a proxy STA is elected using an offer-based approach. As illustrated in FIG. 15A, the wireless communication system 1500 includes a service provider STA 1502 and a proxy STA 1504.

In an embodiment, the service provider STA 1502 may broadcast a discovery frame broadcast message 1510. The discovery frame broadcast message 1510 may include identification data and a wake up schedule. For example, identification data may include a STA identifier and/or one or more service identifiers. A STA identifier may include a MAC address, an application-based identifier (e.g., a unique username, code, key, token, and/or location associated with an application executed on the STA, such as a social networking application, an email application, a GPS application, etc.), an Internet Protocol (IP) address (e.g., an IPv6 or IPv4 "link local" address, etc.), and/or a device name. A service identifier may include a service discovery message, an application identifier, and/or a service advertisement interval. A wake up schedule may include information on a time when the STA will be awake to listen for messages (e.g., pages) from other devices and which channel the STA can be reached on when the STA is awake. In this way, the service provider STA 1502 may periodically enter a sleep mode and conserve power.

In some embodiments, the discovery frame broadcast message 1510 also includes information regarding an incentive for another device to serve as a proxy for the service provider STA 1502. For example, the service provider STA 1502 may receive an advertisement from a proxy STA that includes services or the availability of services that are the same as those provided by the service provider STA 1502. The service provider STA 1502 may be able to offer the incentive of fewer collisions and/or a decreased air link occupancy in the wireless communication system 1500 if the proxy STA adds information to the advertisement message identifying the service provider STA 1502 as also offering the particular service.

In a further embodiment, the discovery frame broadcast message 1510 is received by one or more STAs. If a proxy STA, such as the proxy STA 1504, receives the discovery frame broadcast message 1510 and is willing to advertise services on behalf of the service provider STA 1502, then the proxy STA 1504 may transmit a proxy offer message 1512. The proxy STA 1504 may transmit the proxy offer message 1512 if the capabilities of the proxy STA 1504 allow for it to advertise on behalf of the service provider STA 1502. The proxy offer message 1512 includes an offer from the proxy STA 1504 to serve as a proxy STA on behalf of the service provider STA 1502.

The proxy offer message 1512 may further include criteria that the service provider STA 1502 could use in determining whether to allow the proxy STA 1504 to serve as a proxy STA on behalf of the service provider STA 1502. The criteria may include the capabilities of the proxy STA 1504, a proximity of the proxy STA 1504 to the service provider STA 1502, an owner of the proxy STA 1504, a cost of proxy services provided by the proxy STA 1504, the power required for information exchange, whether the proxy STA 1504 is battery-powered or connected to a source of continuously available power, a time of availability of the proxy service offered by the proxy STA 1504, and/or the like. The proxy offer message 1512 may be a unicast message.

In a further embodiment, if the service provider STA 1502 accepts the proxy offer provided by the proxy STA 1504, the service provider STA 1502 responds to the proxy offer message 1512 by transmitting a proxy accept message 1514. The service provider STA 1502 may accept or reject the proxy offer provided by the proxy STA 1504 based on some or all of the criteria listed above. The proxy accept message 1514 may be a unicast message.

In a further embodiment, if the service provider STA 1502 accepts the proxy offer provided by the proxy STA 1504, the proxy STA 1504 may broadcast a discovery frame message 1516. As described above, the discovery frame message 1516 may include a PHY layer and a MAC layer. The discovery frame message 1516 may also include data of the proxy STA 1504, data advertised on behalf of the STAs that the proxy STA 1504 acts as a proxy for, one or more incentives for a device to become a proxy, and/or a time when an advertising service is available.

The data of the proxy STA 1504 may include information regarding which services are available at the proxy STA 1504. For example, the data may include information informing remote STAs that a first service (e.g., a temperature measurement, a pressure measurement, GPS coordinates, an ambient sound measurement, an ambient light measurement, a humidity measurement, an emergency alarm sensor measurement, etc.) is available at the proxy STA 1504. Thus, the data may include a description of the service and a source address of the proxy STA 1504.

Alternatively, the data may include the services provided by the proxy STA 1504. For example, the data may include the temperature measurement, the pressure measurement, and/or the GPS coordinates. In this way, the remote STAs would not need to contact the proxy STA 1504 in order to obtain the services. Thus, the data may include a description of the service and the service itself.

The data advertised on behalf of the STAs that the proxy STA 1504 acts as a proxy for may include information regarding which services are available at which STAs. For example, the data may include information informing remote STAs that a first service (e.g., a temperature measurement, a pressure measurement, GPS coordinates, an ambient sound measurement, an ambient light measurement, a humidity measurement, an emergency alarm sensor measurement, etc.) is available at the service provider STA 1502. Thus, the data may include a description of the service and a source address of the STA that provides the service.

Alternatively, the data may include the services provided by the service provider STAs. For example, the data may include the temperature measurement, the pressure measurement, and/or the GPS coordinates. In this way, the remote STAs would not need to contact the service provider STAs in order to obtain the services. Thus, the data may include a description of the service and the service itself, and a destination address of the discovery frame message 1516 may be set to a multicast address.

In a further embodiment, the discovery frame message 1516 also includes some or all of the information provided by the service provider STA 1502 in the discovery frame broadcast message 1510. The information included in the discovery frame message 1516 may be at the discretion of the proxy STA 1504 or the service provider STA 1502.

Figure 15B:
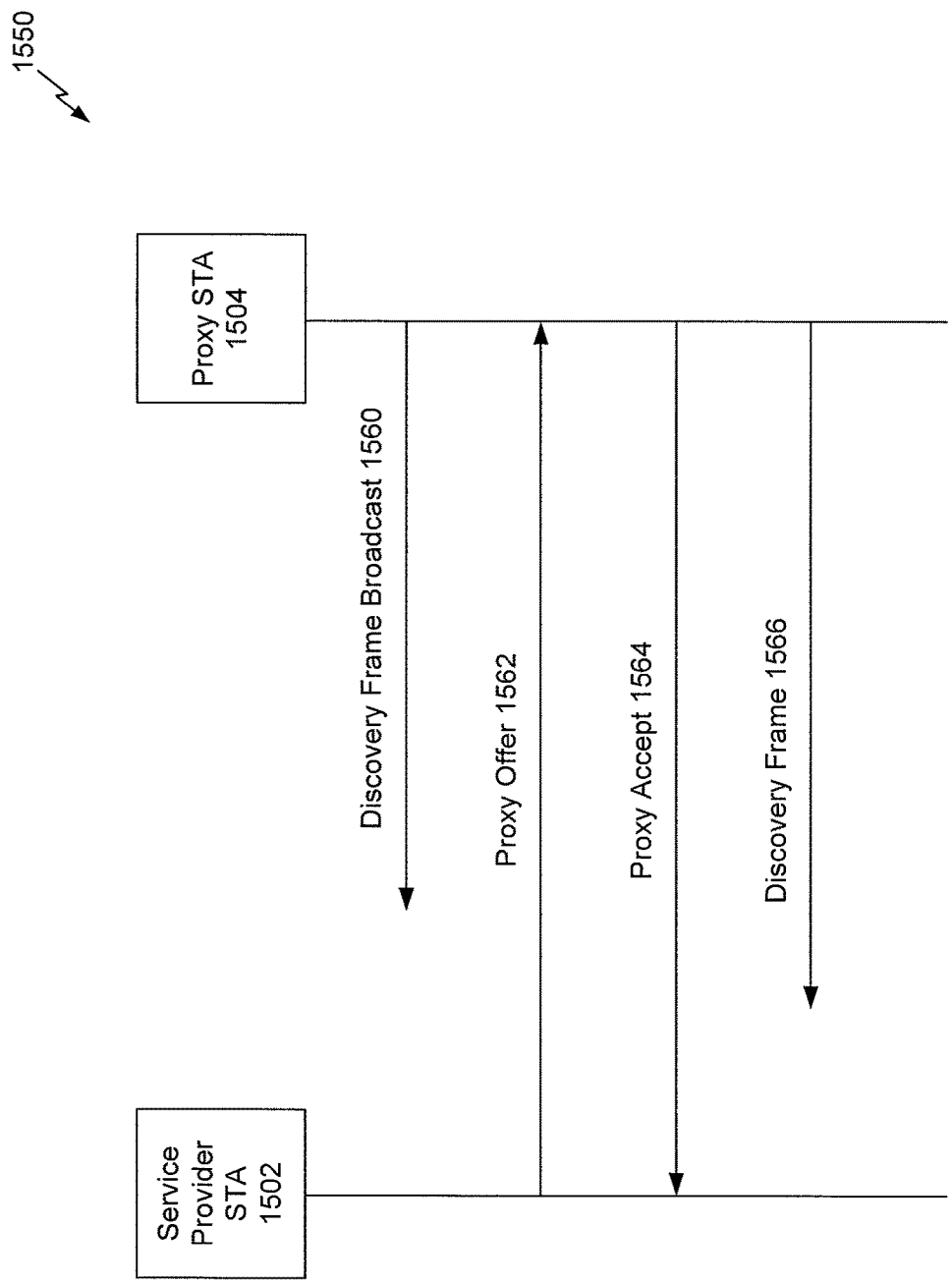
FIG. 15B illustrates a wireless communication system in which a proxy station is elected using a request-based approach.

In another embodiment, a STA may be selected as a proxy STA via a request-based approach. FIG. 15B illustrates a wireless communication system 1550 in which a proxy STA is elected using a request-based approach. As illustrated in FIG. 15B, the wireless communication system 1550 includes a service provider STA 1502 and a proxy STA 1504.

In an embodiment, the proxy STA 1504 may broadcast a discovery frame broadcast message 1560. The discovery frame broadcast message 1560 may include the proxy capabilities of the proxy STA 1504. The discovery frame broadcast message 1560 may further include other criteria that the service provider STA 1502 could use in determining whether to allow the proxy STA 1504 to serve as a proxy STA on behalf of the service provider STA 1502. The other criteria may include the a proximity of the proxy STA 1504 to the service provider STA 1502, an owner of the proxy STA 1504, a cost of proxy services provided by the proxy STA 1504, the power required for information exchange, whether the proxy STA 1504 is battery-powered or connected to a source of continuously available power, a time of availability of the proxy service offered by the proxy STA 1504, and/or the like.

In a further embodiment, the discovery frame broadcast message 1560 is received by one or more STAs. If a service provider STA, such as the service provider STA 1502, receives the discovery frame broadcast message 1560 and is willing to allow the proxy STA 1504 to serve as a proxy on behalf of the service provider STA 1502, then the service provider STA 1502 may transmit a proxy offer message 1562. The service provider STA 1502 may transmit the proxy offer message 1562 if it determines that it would accept the proxy STA 1504 as a proxy STA. The service provider STA 1502 may make this determination based on some or all of the criteria listed above (e.g., the information included in the discovery frame broadcast message 1560).

The proxy offer message 1562 may include may include identification data of the service provider STA 1502, the wake up schedule of the service provider STA 1502, and/or information regarding incentives to act as a proxy on behalf of the service provider STA 1502, as described above with respect to the discovery frame broadcast message 1560 of FIG. 15A. The proxy offer message 1562 may be a unicast message.

In a further embodiment, if the proxy STA 1504 accepts the proxy offer provided by the service provider STA 1502, the proxy STA 1504 responds to the proxy offer message 1562 by transmitting a proxy accept message 1564. The proxy STA 1504 may accept or reject the proxy offer provided by the service provider STA 1502 based on some or all of the information included in the proxy offer message 1562. The proxy accept message 1564 may be a unicast message.

In a further embodiment, if the proxy STA 1504 accepts the proxy offer provided by the service provider STA 1502, the proxy STA 1504 may broadcast a discovery frame message 1566. The discovery frame message 1566 may include the same or similar information as the discovery frame message 1516 described above with respect to FIG. 15A.

In another embodiment, a STA may be selected as a proxy STA via a manual approach. In the manual approach, a service provider STA may discovery a proxy STA, either by transmitting a discovery frame broadcast message, such as the discovery frame broadcast message 1510 of FIG. 15A, or by receiving a discovery frame broadcast message from the proxy STA, such as the proxy discovery frame broadcast message 1560 of FIG. 15B.

Once the service provider STA has discovered the proxy STA, the service provider STA may transmit a proxy offer or request to the proxy STA. The proxy offer or request may be similar to the proxy offer message 1562 of FIG. 15B.

Once the proxy STA receives a proxy offer or request from the service provider STA, a user of the proxy STA may be notified of the proxy offer or request. For example, the notification may appear on a display of the proxy STA (e.g., via user interface 222).

The user may have the power to grant or reject the proxy offer or request. For example, the user may push, press, or otherwise select a button to grant or reject the proxy offer or request. As another example, the user may make the selection via software that is executed by the proxy STA. The selection may be made via the user interface 222.

In another embodiment, a STA may be selected as a proxy STA via any combination of the proactive approach, the offer-based approach, the request-based approach, and/or the manual approach described above.

In an embodiment, a first STA may be selected as a proxy STA in a wireless communication system via one approach or a combination of approaches. A second STA may then be selected as a proxy STA in the same wireless communication system using the same approach or combination of approaches or a different approach or combination of approaches.

Either in the process of selecting a proxy STA (e.g., via one of the approaches described above) or after a proxy STA has been selected, the service provider STA provides information to the selected proxy STA. The information may include the identification data, the wake up schedule, and/or information regarding incentives to act as a proxy on behalf of the service provider STA, as described above with respect to FIG. 15A. Furthermore, once the proxy STA has been selected using any one of the approaches described above, the proxy STA transmits (e.g., via a broadcast transmission) a discovery frame, such as the discovery frame message 1516 and/or the discovery frame message 1566 described above with respect to FIGS. 15A-B.

Proxy STA Departure and Deselection

A STA that acts as a proxy on behalf of one or more other STAs may eventually leave the wireless communication system. For example, the STA may be physically moved outside the communication range of the wireless communication system. As another example, the STA may be shut off. In some cases, the STA may notify other STAs of the departure from the wireless communication system. In other cases, the STA may not notify the other STAs of the departure from the wireless communication system.

In an embodiment, a proxy STA may inform each of the service provider STAs that it advertises for of an impending departure. For example, the proxy STA may inform the service provider STAs if the departure is planned. The proxy STA may inform the service provider STAs via a termination message. The termination message may include a time when the proxy STA expects to depart the wireless communication system.

In another embodiment, a proxy STA does not inform each of the service provider STAs that is advertises for of a departure. In order to determine when a proxy STA has departed the wireless communication system, a service provider STA may periodically listen for service advertisements transmitted by the proxy STA. If the service provider STA does not receive a service advertisement from the proxy STA for a predetermined period of time, the service provider STA may send a confirmation message to the proxy STA asking for confirmation that the proxy STA is still associated with the wireless communication system. If no messages are received from the proxy STA in response to the confirmation message after a predetermined period of time, the service provider STA may elect a new proxy STA. The election of the new proxy STA may be made using any of the approaches described above.

The predetermined period of time that the service provider STA waits before sending the confirmation message may depend on the frequency at which service advertisements are transmitted by the proxy STA and/or admissible latency constraints of the proxy STA. Likewise, the predetermined period of time that the service provider STA waits before electing a new proxy STA may depend on the frequency at which service advertisements are transmitted by the proxy STA and/or admissible latency constraints of the proxy STA.

In an embodiment, a remote STA may assist the service provider STA in determining whether to deselect the proxy STA and elect a new proxy STA. For example, the remote STA may also be listening for service advertisements transmitted by the proxy STA. If the remote STA does not receive a service advertisement for a predetermined period of time (e.g., the period of time may be based on the considerations described above), the remote STA may inform the service provider STA that it is not receiving the service advertisements and/or try to communicate with the proxy STA. If the remote STA cannot contact the proxy STA (e.g., using the procedure described above with respect to the service provider STA contacting the proxy STA), the remote STA may inform the service provider STA that the remote STA is unable to contact the proxy STA. As another example, the remote STA may periodically try to connect with the proxy STA. If the remote STA is unable to connect with the proxy STA, the remote STA may so inform the service provider STA. If the service provider STA receives a predetermined number of messages indicating that the proxy STA cannot be contacted, then the service provider STA may begin the procedure to elect a new proxy STA as described above. The messages may indicate that the proxy STA cannot be contacted by including error codes and/or error messages indicating such.

Service Provider STA Departure and Deselection

In some cases, a service provider STA may eventually leave the wireless communication system. For example, the service provider STA may be physically moved outside the communication range of the wireless communication system. As another example, the service provider STA may be shut off. The service provider STA may inform the proxy STA of an impending departure so that the proxy STA can stop acting as a proxy for the service provider STA. In other instances, however, the service provider STA may not inform the proxy STA of a departure.

In an embodiment, a remote STA may assist a proxy STA in determining whether a service provider has left the wireless communication system. For example, a remote STA may be in communication with the service provider STA in order to obtain the services offered by the service provider STA. If the remote STA is unable to connect to the service provider STA, the remote STA may inform the proxy STA of this development. If the proxy STA receives a predetermined number of messages from the remote STA indicating that the remote STA cannot connect with the service provider STA, then the proxy STA may stop acting as a proxy for the service provider STA.

Use Case

Figure 16:
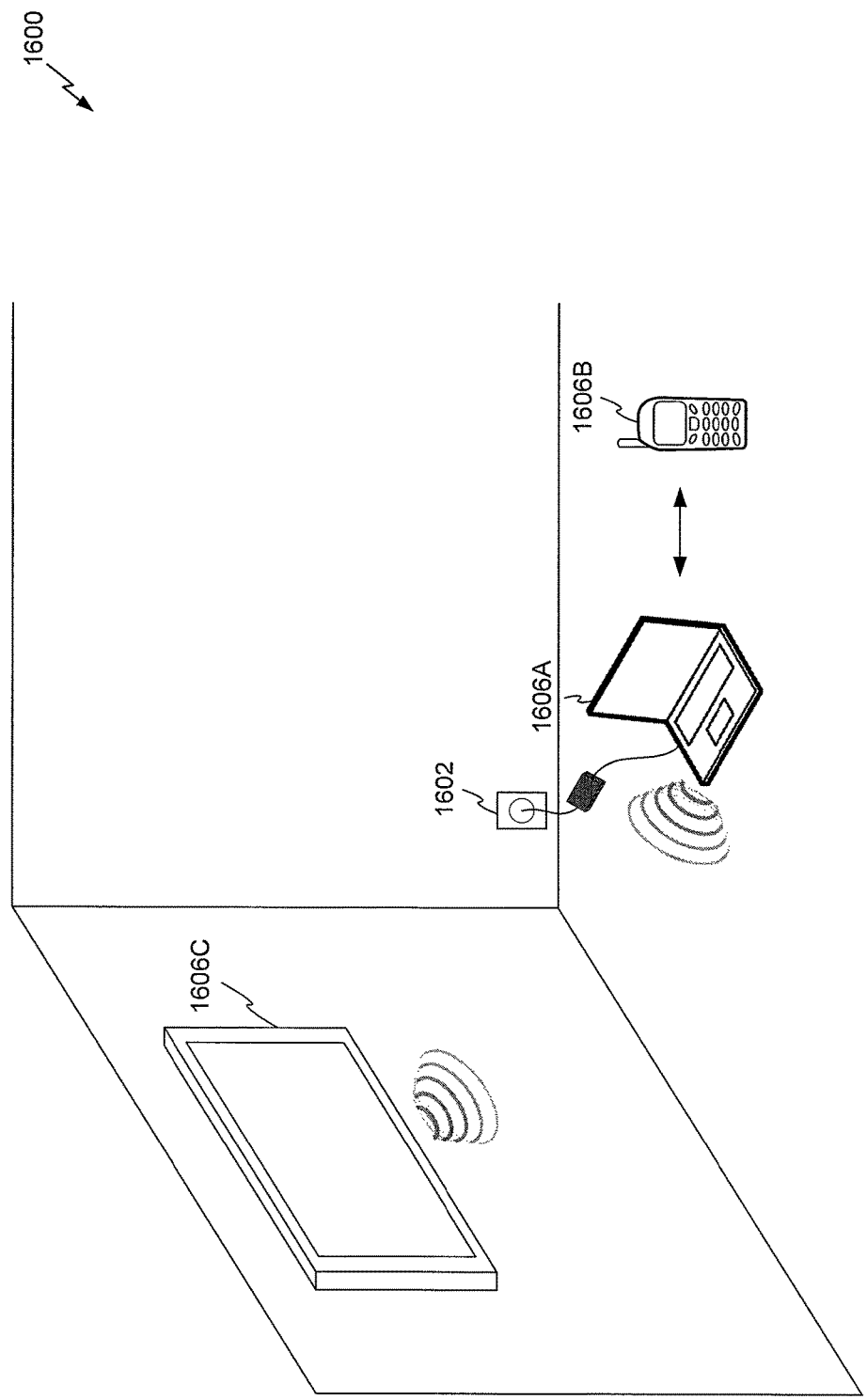
FIG. 16 illustrates a wireless communication system that includes a device that acts as a proxy for another device.

FIG. 16 illustrates a wireless communication system 1600 that includes a device that acts as a proxy for another device. As illustrated in FIG. 16, the wireless communication system 1600 includes a power outlet 1602, a laptop 1606A, a mobile phone 1606B, and a television 1606C. In an embodiment, the laptop 1606A is considered a proxy STA, the mobile phone 1606B is considered a service provider STA, and the television 1606C is considered a remote STA.

As illustrated in FIG. 16, the mobile phone 1606B is not connected to a source of continuously available power. Rather, the mobile phone 1606B is running on batteries. The laptop 1606A, on the other hand, is connected to a source of continuously available power in the form of the power outlet 1602. In an embodiment, the fact that the laptop 1606A is connected to a source of continuously available power is the deciding factor in determining whether the laptop 1606A or the mobile phone 1606B should be a proxy STA. Accordingly, the laptop 1606A may function as a proxy for the mobile phone 1606B. While the television 1606C may also be connected to a source of continuously available power, the television 1606C may use the services provided by the mobile phone 1606B, and thus serve as a remote STA. The capabilities of the laptop 1606A may also factor into the selection of the laptop 1606A as the proxy STA rather than the television 1606C.

In an embodiment, the mobile phone 1606B includes a sensor, such as a temperature sensor. In some embodiments, the laptop 1606A may advertise on behalf of the mobile phone 1606B that the mobile phone 1606B offers services related to temperature readings. The advertisement may include an identification of the mobile phone 1606B, such as an identity stored on a subscriber identity module (SIM) card or a name of the mobile phone 1606B, as well. In other embodiments, the laptop 1606A may advertise the temperature readings themselves on behalf of the mobile phone 1606B.

The television 1606C may receive the advertisement and either contact the mobile phone 1606B to receive the temperature readings (e.g., if the advertisement includes information about which device offers which service) or make use of the temperature readings (e.g., if the temperature readings are included in the advertisement). For example, the television 1606C may use the temperature readings to provide the room temperature to a user as the user is watching television.

In another embodiment, the mobile phone 1606B includes a GPS chip and the laptop 1606A includes a GPS chip. The television 1606C may desire location information for certain applications, such as mapping applications, and can receive this information from either the mobile phone 1606B or the laptop 1606A. While both the mobile phone 1606B and the laptop 1606A include the capability to determine location, the laptop 1606A may determine the location instead of the mobile phone 1606B so that the mobile phone 1606B can conserve power. The laptop 1606A may either advertise that the laptop 1606A offers location services or advertise the location itself. The advertisement may also include information informing remote STAs, such as the television 1606C, that the location services or the location itself is being advertised on behalf of the mobile phone 1606B. In this way, the remote STAs may receive services from the proxy STA with the understanding that the services are the same or similar to the services that would be offered by the service provider STA. The service provider STA in turn would not need to offer the services to any device, and thereby conserve power. Thus, the mobile phone 1606B may conserve power by not having to determine a location using the GPS chip, yet still have this information available to other devices, like the television 1606C, that may desire to use the location information.

Figure 17:
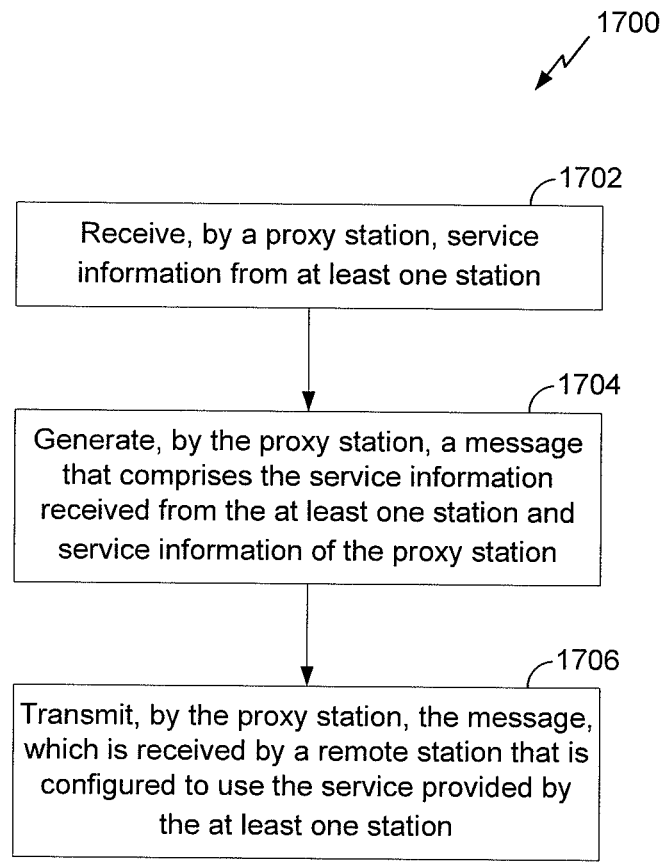
FIG. 17 is a flowchart of a process for using a proxy station in the wireless communication systems of FIGS. 1a, 1b, 14, 15A, 15B, and/or 16.

FIG. 17 is a flowchart of a process 1700 for using a proxy station in the wireless communication systems of FIGS. 1a, 1b, 14, 15A, 15B, and/or 16. At block 1702, service information from at least one station is received by a proxy station. In an embodiment, the service information includes information regarding a service that is provided by the at least one station or the service itself. At block 1704, a message is generated by the proxy station that comprises the service information received from the at least one station and service information of the proxy station. In an embodiment, the service information includes information regarding a service that is available at the proxy station or the service itself. At block 1706, the message is transmitted by the proxy station, which is received by a remote station that is configured to use the service provided by the at least one station. After block 1706, the process 1700 ends.

Figure 18:
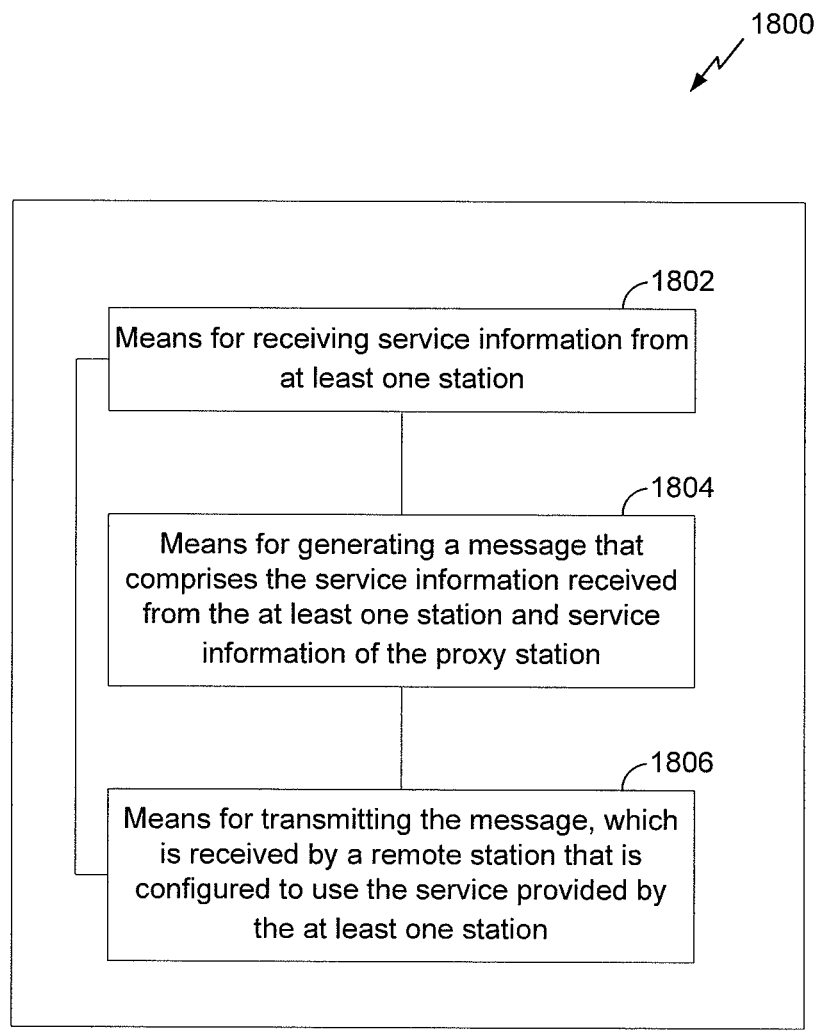
FIG. 18 is a functional block diagram of an exemplary device that may be employed within the wireless communication systems of FIGS. 1a, 1b, 3, 4A, 4B, and/or 5.

FIG. 18 is a functional block diagram of an exemplary device 1800 that may be employed within the wireless communication systems 100, 160, 1400, 1500, 1550, and/or 1600. The device 1800 includes means 1802 for receiving service information form at least one station. In an embodiment, means 1802 for receiving service information form at least one station may be configured to perform one or more of the functions discussed above with respect to block 1702. The means 1802 for receiving service information form at least one station may include one or more of a programmable chip, a hardware processor, a memory, and a network interface. For example, the means 1802 for receiving service information form at least one station may include the receiver 212 and/or the processor 204.

The device 1800 further includes means 1804 for generating a message that comprises the service information received from the at least one station and service information of the proxy station. In an embodiment, means 1804 for generating a message that comprises the service information received from the at least one station and service information of the proxy station may be configured to perform one or more of the functions discussed above with respect to block 1704. The means 1804 for generating a message that comprises the service information received from the at least one station and service information of the proxy station may include one or more of a programmable chip, a hardware processor, a memory, and a network interface. For example, the means 1804 for generating a message that comprises the service information received from the at least one station and service information of the proxy station may include the hardware processor 204.

The device 1800 further includes means 1806 for transmitting the message, which is received by a remote station that is configured to use the service provided by the at least one station. In an embodiment, means 1806 for transmitting the message, which is received by a remote station that is configured to use the service provided by the at least one station may be configured to perform one or more of the functions discussed above with respect to block 1806. The means 1806 for transmitting the message, which is received by a remote station that is configured to use the service provided by the at least one station may include one or more of a programmable chip, a hardware processor, a memory, and a network interface. For example, the means 1806 for transmitting the message, which is received by a remote station that is configured to use the service provided by the at least one station may include the transmitter 210 and/or the processor 204.

Figure 19:
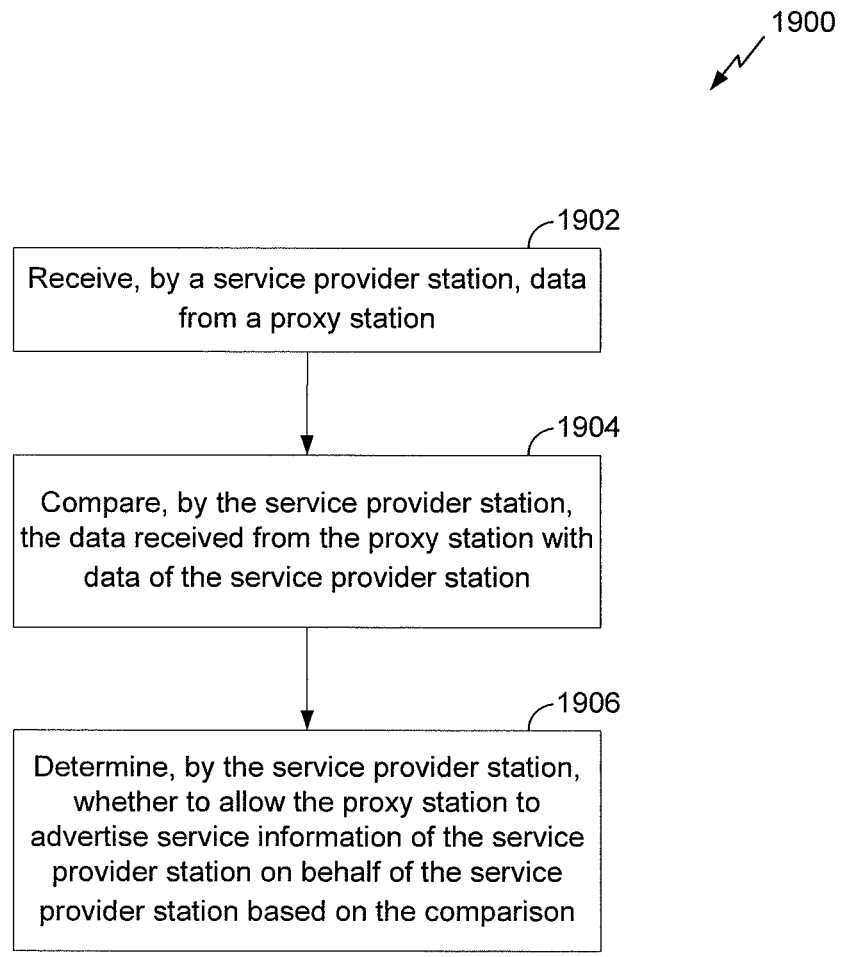
FIG. 19 is another flowchart of a process for using a proxy station in the wireless communication system of FIGS. 1a, 1b, 14, 15A, 15B, and/or 16.

FIG. 19 is another flowchart of a process 1900 for using a proxy station in the wireless communication systems of FIGS. 1a, 1b, 14, 15A, 15B, and/or 16. At block 1902, data is received by a service provider station from a proxy station. In an embodiment, the data includes a proxy preference number. In a further embodiment, a proxy preference number is determined based a set of criteria, such as the capabilities of the station (e.g., whether the station is battery-powered or connected to a source of continuously available power, whether the station provides services to other devices, whether the station uses services provided by other devices, a period of time that the station expects to be associated with the wireless communication system, whether the station experiences high or low levels of noise when communicating within the wireless communication system, the transmission and/or reception strength of the transceiver of the station, or the like), a proximity of the station to one or more other stations, an owner of the station and/or one or more other stations, a cost of proxy services if provided by the station, the power required for information exchange, a time of availability of the proxy service if offered by the station, and/or the like.

At block 1904, the data received from the proxy station is compared by the service provider station with data of the service provider station. In an embodiment, the comparison includes comparing a proxy preference number of the proxy station with a proxy preference number of the service provider station.

At block 1906, the service provider station determines whether to allow the proxy station to advertise service information of the service provider station on behalf of the service provider station based on the comparison. In an embodiment, the service information includes information regarding a service that is provided by the service provider station or the service itself. In a further embodiment, the proxy station transmits a message comprising the service information if the apparatus allows the proxy station to advertise the service information.

In a further embodiment, the message is received by a remote station that is configured to use the service provided by the service provider station. In a further embodiment, the service provider station determines to allow the proxy station to advertise service information if a proxy preference number of the proxy station is higher than a proxy preference number of the service provider station.

In some aspects, the proxy preference number of the proxy station may indicate whether the proxy station actually has a proxy capability. For example, if the proxy preference number of the proxy station is zero, or some other predetermined value, it may indicate in some aspects that the proxy station does not have proxy capability. A non-zero value may indicate the proxy station does have proxy capability.

After block 1906, the process 1900 ends.

Figure 20:
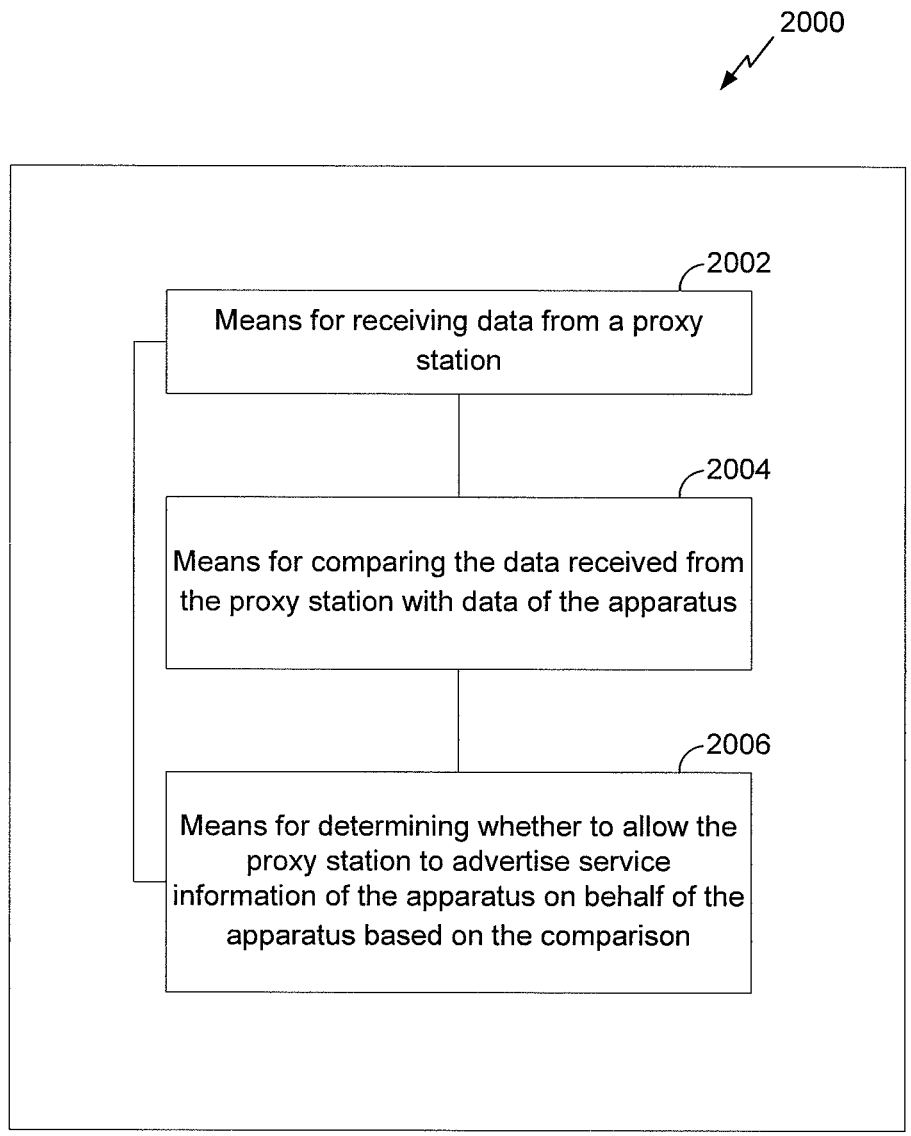
FIG. 20 is another functional block diagram of an exemplary device that may be employed within the wireless communication system of FIGS. 1a, 1b, 14, 15A, 15B, and/or 16.

FIG. 20 is another functional block diagram of an exemplary device 2000 that may be employed within the wireless communication systems 100, 160, 1400, 1500, 1550, and/or 1600. The device 2000 includes means 2002 for receiving data from a proxy station. In an embodiment, means 2002 for receiving data from a proxy station may be configured to perform one or more of the functions discussed above with respect to block 1902. The means 2002 for receiving data from a proxy station may include one or more of a programmable chip, a hardware processor, a memory, and a network interface. For example, the means 2002 for receiving data from a proxy station may include the receiver 212.

The device 2000 further includes means 2004 for comparing the data received from the proxy station with data of the apparatus. In an embodiment, means 2004 for comparing the data received from the proxy station with data of the apparatus may be configured to perform one or more of the functions discussed above with respect to block 1904. The means 2004 for comparing the data received from the proxy station with data of the apparatus may include one or more of a programmable chip, a hardware processor, a memory, and a network interface. For example, the means 2004 for comparing the data received from the proxy station with data of the apparatus may include the hardware processor 204.

The device 2000 further includes means 2006 for determining whether to allow the proxy station to advertise service information of the apparatus on behalf of the apparatus based on the comparison. In an embodiment, means 2006 for determining whether to allow the proxy station to advertise service information of the apparatus on behalf of the apparatus based on the comparison may be configured to perform one or more of the functions discussed above with respect to block 1906. The means 2006 for determining whether to allow the proxy station to advertise service information of the apparatus on behalf of the apparatus based on the comparison may include one or more of a programmable chip, a hardware processor, a memory, and a network interface. For example, the means 2006 for c determining whether to allow the proxy station to advertise service information of the apparatus on behalf of the apparatus based on the comparison may include the hardware processor 204.

Figure 21:
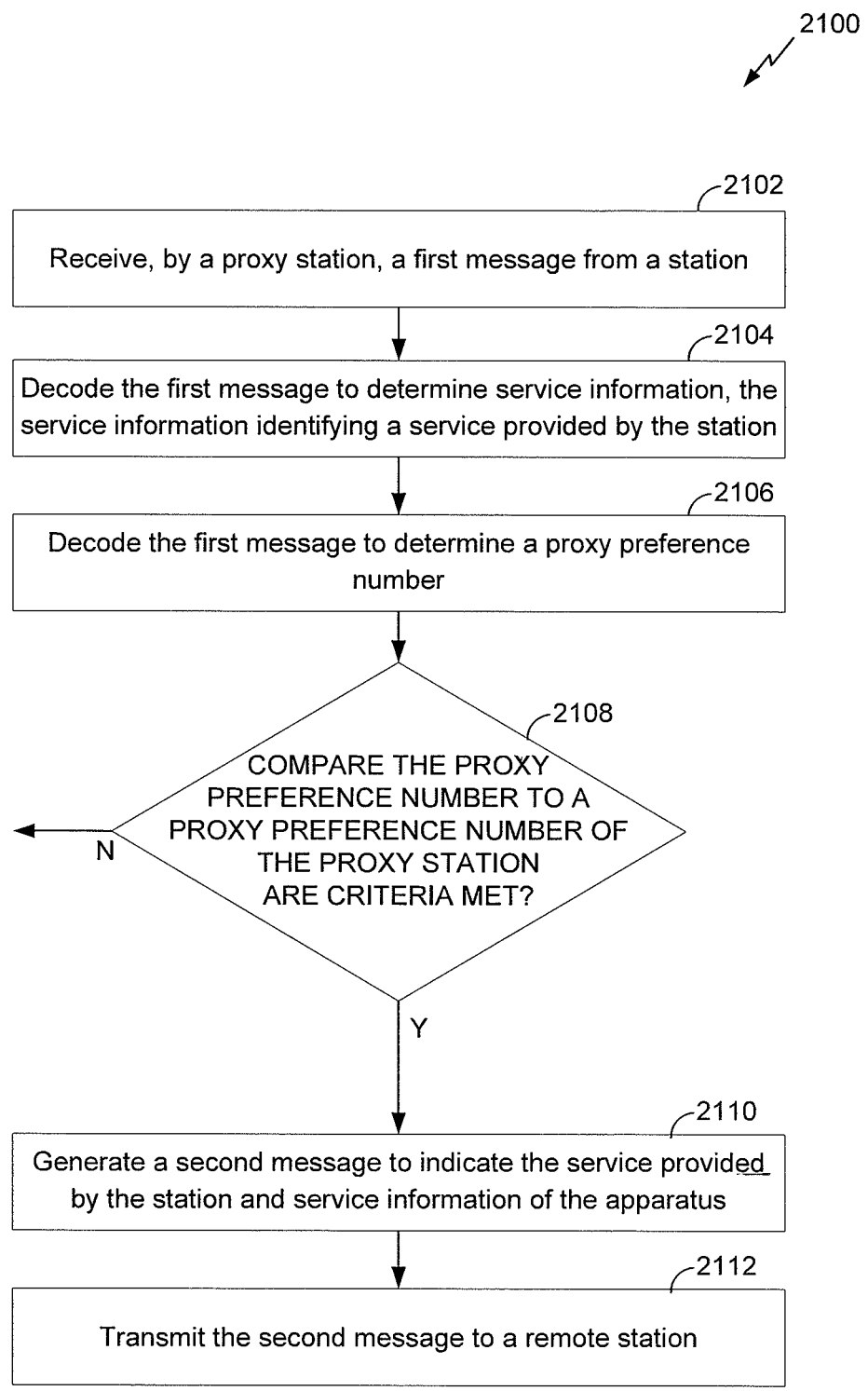
FIG. 21 is another flowchart of a process for using a proxy station in the wireless communication system of FIGS. 1a, 1b, 14, 15A, 15B, and/or 16.

FIG. 21 is a flowchart of a process 2100 for using a proxy station in the wireless communication systems of FIGS. 1*a*, 1*b*, 14, 15A, 15B, and/or 16. In some aspects, process 2100 may be performed by the wireless device 202.

At block 2102, a first message is received from a station. In some aspects, the reception of the first message may be performed by the receiver 212 and/or the processor 204. In block 2104, the first message is decoded to determine service information. Decoding of the message in block 2104 may be performed, in some aspects, by the processor 204.

The service information identifies a service provided by the station or the service itself. In various aspects, the service information comprises one or more of an indication of an availability of pressure measurements, an indication of an availability of temperature measurements, an indication of an availability of location measurements, an indication of an availability of ambient sound measurements, an indication of an availability of ambient light measurements, an indication of an availability of humidity measurements, an indication of an availability of emergency alarm sensor measurements, a pressure measurement, a temperature measurement, a location measurement, an ambient sound measurement, an ambient light measurement, a humidity measurement, or an emergency alarm sensor measurement.

At block 2106, the first message is decoded to determine a proxy preference number. Block 2106 may be performed, in some aspects, by the processor 204. The coded proxy preference number may be similar to the proxy preference numbers discussed above with respect to FIGS. 14 and 15A-B.

In decision block 2108, the determined proxy preference number is compared to a proxy preference number of the proxy station. The comparison may determine if a particular criteria is met, which may vary by embodiment. For example, the criteria may determine whether the determined proxy preference number is greater than (in a first aspect), greater than or equal to (in a second aspect), less than (in a third aspect), or less than or equal (in a fourth aspect) to the proxy preference number of the proxy station.

If the criteria is not met, process 2100 continues with other processing. If the criteria is met, process 2100 moves from decision block 2108 to block 2110, and generates a second message indicating the service provided by the station and service information of the proxy station.

Block 2112 transmits the second message to a remote station. In some aspects, blocks 2110 and 2112 may be performed by the transmitter 210 and/or the processor 204. In some aspects, the remote station is configured to use the service provided by the at least one station. In some aspects, the remote station may use a service of the proxy/or the service information of the proxy station.

In some aspects, block 2110 includes generating a departure message indicating the proxy station is leaving the wireless communication network and transmitting the departure message.

Some aspects of process 2100 include receiving a third message from the remote station and decoding the third message to determine an error. The error indicates remote station cannot contact the station. In some aspects, if the proxy station receives a number of errors from the remote station that exceed an error threshold, no new service messages may be generated and transmitted to the remote station. In some aspects, after a period of time, the error count may be reset and additional messages can again be transmitted to the remote station.

In some aspects, the second message is transmitted to a second proxy station. In some of these aspects, the second message is only transmitted to the second proxy station if a proxy preference number of the proxy station is lower than a proxy preference number of the second proxy station.

In some aspects, the proxy station operates under a proxy offer scheme as discussed above with respect to FIG. 15A. In these aspects, process 2100 includes transmitting a proxy offer message to the station. The transmission of the proxy offer message may be in response to reception and decoding of service information from the station. In some aspects, the generation and transmission of the second message in blocks 2108 and 2110 may be conditioned on reception of a proxy offer accept message from the station.

In some aspects, the proxy station operates under a proxy request scheme as discussed above with respect to FIG. 15B. In these aspects, process 2100 receives a proxy request message from the station, and determines whether to accept the proxy request. In some aspects, determining whether to accept the proxy request may be based on capabilities of a device performing process 2100 and/or the proxy station. In some aspects, the determining is based on a command issued by a user of the proxy station, or a user of a device performing process 2100.

Process 2100 further includes in these aspects generating and transmitting a broadcast message indicating that the proxy station is configured to serve as a proxy station. In some aspects, the broadcast message is further generated to indicate some type of incentive for receiving stations to become a proxy (as described above) and may indicate a timeframe when proxy service is available from the proxy station.

It should be understood that any reference to an element herein using a designation such as "first," "second," and so forth does not generally limit the quantity or order of those elements. Rather, these designations may be used herein as a convenient wireless device of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-20 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional hardware processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for communicating data in a wireless communications network, comprising:
   receiving, by a device, a first message from a station;
   decoding, at the device, the first message to determine a proxy preference number of the station and to determine service information, the service information identifying a service provided by the station, and the proxy preference number of the station indicating a level of capability or a level of interest the station has in being a proxy station;
   comparing the determined proxy preference number of the station with a proxy preference number of the device, the comparison being based at least on the indicated level of capability or the indicated level of interest the station has in being a proxy station; and
   based on the comparison:
      generating, at the device, a second message, wherein the second message is generated to indicate the service provided by the station and the service information of the device; and
      transmitting, by the device, the second message to a remote station, the remote station being different from the station.

2. The method of claim 1,
   wherein the generating and transmitting of the second message is conditioned on a result of the comparison.

3. The method of claim 1, further comprising:
   receiving a third message from the remote station; and
   decoding the third message to determine an error indicating that the remote station cannot contact the station.

4. The method of claim 1, further comprising:
   transmitting a proxy offer message to the station in response to decoding the service information from the station; and
   generating the second message if a proxy accept message is received from the station.

5. The method of claim 1, further comprising:
   receiving a proxy request message from the station;
   determining whether to accept the proxy request;
   generating a broadcast message indicating the device is configured to serve as a proxy station if the proxy request is accepted; and
   transmitting the broadcast message to a broadcast address.

6. The method of claim 1, wherein the service information comprises at least one of an indication of an availability of pressure measurements, an indication of an availability of temperature measurements, an indication of an availability of location measurements, an indication of an availability of ambient sound measurements, an indication of an availability of ambient light measurements, an indication of an availability of humidity measurements, an indication of an availability of emergency alarm sensor measurements, a pressure measurement, a temperature measurement, a location measurement, an ambient sound measurement, an ambient light measurement, a humidity measurement, and an emergency alarm sensor measurement.

7. The method of claim 1, further comprising:
   receiving a station identifier and a wake up schedule from the station;
   decoding one or more of a media access control (MAC) address, an application based identifier, an Internet Protocol (IP) address, and a device name from the station identifier;
   decoding one or more of a time when the station will be awake to listen for messages from other devices and a channel that the station will use to communicate during the time, from the wake up schedule; and
   generating the second message to indicate the wake up schedule.

8. An apparatus for communicating data in a wireless communications network, comprising:
   a receiver configured to receive a first message from a station;
   a hardware processor configured to:
      decode the first message to determine service information, the service information identifying a service provided by the station, and further configured to decode the message to determine a proxy preference number of the station, the proxy preference number of the station indicating a level of capability or a level of interest the station has in being a proxy station;

compare the determined proxy preference number of the station with a proxy preference number of the apparatus, the comparison being based at least on the indicated level of capability or the indicated level of interest the station has in being a proxy station; and generate a second message to indicate the service provided by the station and the service information of the apparatus, the generating being based on the comparison; and a transmitter configured to transmit the second message to a remote station, the transmitting being based on the comparison.

9. The apparatus of claim 8, wherein the hardware processor is further configured to condition the generation and transmission of the second message on a result of the comparison.

10. The apparatus of claim 8, wherein the transmitter is further configured to transmit a proxy offer message to the station in response to decoding the service information from the station, and wherein the hardware processor is further configured to generate the second message if the receiver receives a proxy accept message from the station.

11. The apparatus of claim 8,
wherein the receiver is configured to receive a proxy request message from the station,
wherein the hardware processor is configured to determine whether to accept the proxy request,
wherein the hardware processor is further configured to, based on the determination, generate a broadcast message indicating the apparatus is configured to serve as a proxy station, and
the transmitter is configured to transmit the broadcast message to a broadcast address.

12. The apparatus of claim 11, wherein the hardware processor is further configured to generate the broadcast message to indicate an incentive to become a proxy and to indicate a time when proxy service is available.

13. The apparatus of claim 8, wherein the service information comprises at least one of an indication of an availability of pressure measurements, an indication of an availability of temperature measurements, an indication of an availability of location measurements, an indication of an availability of ambient sound measurements, an indication of an availability of ambient light measurements, an indication of an availability of humidity measurements, an indication of an availability of emergency alarm sensor measurements, a pressure measurement, a temperature measurement, a location measurement, an ambient sound measurement, an ambient light measurement, a humidity measurement, and an emergency alarm sensor measurement.

14. The apparatus of claim 8,
wherein the receiver is further configured to receive a station identifier and a wake up schedule from the station,
wherein the station identifier comprises at least one of a media access control (MAC) address, an application based identifier, an Internet Protocol (IP) address, and a device name,
wherein the wake up schedule comprises a time when the station will be awake to listen for messages from other devices and a channel that the station will use to communicate during the time,
and the hardware processor is further configured to generate the second message to indicate the wake up schedule.

15. A method for communicating data in a wireless communications network, comprising:
receiving, by a device, data from a proxy station, the data including a proxy preference number of the proxy station, the proxy preference number of the proxy station indicating a level of capability or a level of interest the proxy station has in being a selected proxy station;
comparing, at the device, the data received from the proxy station with data associated with the device, the comparison being based at least on the indicated level of capability or the indicated level of interest the proxy station has in being a selected proxy station;
determining, at the device, whether to allow the proxy station to advertise service information of the device on behalf of the device based on the comparison, wherein the service information identifies a service provided by the device; and
transmitting, by the device, a message to the proxy station based on the determination.

16. The method of claim 15, wherein the method further comprises determining whether the proxy station has proxy capability based on the proxy preference number.

17. The method of claim 15, further comprising:
determining that a service advertisement has not been received from the proxy station within a predetermined time and the proxy station is allowed to advertise; and
determining that the proxy station left the wireless communications network if the receiver does not receive a service advertisement from the proxy station within a predetermined time and the proxy station is allowed to advertise.

18. The method of claim 15, further comprising transmitting a confirmation message to the proxy station, wherein the confirmation message requests the proxy station to transmit an acknowledgment message confirming that the proxy station is associated with the wireless communications network.

19. The method of claim 15, further comprising:
broadcasting a discovery frame comprising a request for a proxy station;
receiving a proxy offer message from the proxy station, wherein the proxy offer message comprises the data of the proxy station; and
transmitting a proxy acceptance message in response to receiving the proxy offer message from the proxy station if the proxy station is allowed to advertise the service information.

20. The method of claim 15, further comprising:
receiving a discovery frame broadcast message from the proxy station;
decoding the discovery frame broadcast message to determine that the proxy station is configured to serve as a proxy station; and
transmitting a proxy offer message to the proxy station if the proxy station is allowed to advertise service information of the device on behalf of the device.

21. The method of claim 20, further comprising generating the discovery frame broadcast message to indicate an incentive for a station to become a proxy or to indicate a time when service from the device is available.

22. The method of claim 15, wherein the service information of the device comprises at least one of an indication of an availability of pressure measurements, an indication of an availability of temperature measurements, an indication of an availability of location measurements, an indication of an availability of ambient sound measurements, an indication of an availability of ambient light measurements, an indication of an availability of humidity measurements, an indication of an availability of emergency alarm sensor measurements, a pressure measurement, a temperature measurement, a location measurement, an ambient sound measurement, an ambient light measurement, a humidity measurement, and an emergency alarm sensor measurement.

23. The method of claim 15, further comprising transmitting a station identifier and a wake up schedule to the proxy station, wherein the station identifier comprises at least one of a media access control (MAC) address, an application based identifier, an Internet Protocol (IP) address, and a device name, and wherein the wake up schedule comprises a time when the device will be awake to listen for messages from other devices and a channel that the device will use to communicate during the time.

24. An apparatus for communicating data in a wireless communications network, comprising:
  a receiver configured to receive data from a proxy station, the data including a proxy preference number of the proxy station, the proxy preference number of the proxy station indicating a level of capability or a level of interest the proxy station has in being a selected proxy station;
  a hardware processor configured to compare the data received from the proxy station with data associated with the apparatus, the comparison being based at least on the indicated level of capability or the indicated level of interest the proxy station has in being a selected proxy station, wherein the hardware processor is further configured to determine whether to allow the proxy station to advertise service information of the apparatus on behalf of the apparatus based on the comparison, wherein the service information identifies a service provided by the apparatus; and
  a transmitter configured to transmit a message to the proxy station based on the determination.

25. The apparatus of claim 24, wherein the hardware processor is further configured to determine whether the proxy station has proxy capability based on the proxy preference number.

26. The apparatus of claim 24, wherein the receiver is further configured to receive data from a second proxy station, wherein the hardware processor is further configured to compare the data received from the second proxy station with the data associated with the apparatus, wherein the hardware processor is further configured to determine whether to allow the second proxy station to advertise the service information of the apparatus on behalf of the apparatus based on the comparison of the data received from the second proxy station with the data associated with the apparatus, and the transmitter is configured to transmit a message to the second proxy station based on the determination.

27. The apparatus of claim 24, further comprising a transmitter configured to broadcast a discovery frame, wherein the receiver is further configured to receive a proxy offer message from the proxy station, wherein the proxy offer message comprises the data of the proxy station, wherein the discovery frame comprises a request for a proxy station, and wherein the transmitter is further configured to transmit a proxy acceptance message in response to receiving the proxy offer message from the proxy station if the hardware processor determines to allow the proxy station to advertise the service information.

28. The apparatus of claim 24,
  wherein the receiver is further configured to receive a discovery frame broadcast message from the proxy station,
  wherein the hardware processor is further configured to decode the discovery frame broadcast message to determine that the proxy station is configured to serve as a proxy station, and
  wherein the transmitter is configured to transmit a proxy offer message to the proxy station if the hardware processor determines to allow the proxy station to advertise service information of the apparatus on behalf of the apparatus.

29. The apparatus of claim 24, wherein the service information of the apparatus comprises at least one of an indication of an availability of pressure measurements, an indication of an availability of temperature measurements, an indication of an availability of location measurements, an indication of an availability of ambient sound measurements, an indication of an availability of ambient light measurements, an indication of an availability of humidity measurements, an indication of an availability of emergency alarm sensor measurements, a pressure measurement, a temperature measurement, a location measurement, an ambient sound measurement, an ambient light measurement, a humidity measurement, and an emergency alarm sensor measurement.

30. The apparatus of claim 24, further comprising a transmitter configured to transmit a station identifier and a wake up schedule to the proxy station, wherein the station identifier comprises at least one of a media access control (MAC) address, an application based identifier, an Internet Protocol (IP) address, and a device name, and wherein the wake up schedule comprises a time when the apparatus will be awake to listen for messages from other devices and a channel that the apparatus will use to communicate during the time.

* * * * *